(12) United States Patent
Jacob et al.

(10) Patent No.: US 8,701,834 B2
(45) Date of Patent: Apr. 22, 2014

(54) MECHANICAL ACTUATOR

(75) Inventors: William Vincent Jacob, Chagrin Falls, OH (US); Raymond A Karmansky, North Olmsted, OH (US); Nathan Ryan Daniher, Chagrin Falls, OH (US)

(73) Assignee: Nook Industries, Inc., Cleveland, OH (US)

( * ) Notice: Subject to any disclaimer, the term of this patent is extended or adjusted under 35 U.S.C. 154(b) by 555 days.

(21) Appl. No.: 13/027,522

(22) Filed: Feb. 15, 2011

(65) Prior Publication Data

US 2012/0042741 A1 Feb. 23, 2012

Related U.S. Application Data

(60) Provisional application No. 61/375,432, filed on Aug. 20, 2010.

(51) Int. Cl.
*F16H 57/04* (2010.01)
*F16H 25/12* (2006.01)

(52) U.S. Cl.
USPC ............................................. 184/6.12

(58) Field of Classification Search
USPC .................. 184/6.5, 6.14, 6.17, 18, 20, 100; 74/89.44
See application file for complete search history.

(56) References Cited

U.S. PATENT DOCUMENTS

| | | | |
|---|---|---|---|
| 4,821,456 A | | 4/1989 | Nogaki |
| 5,346,045 A * | | 9/1994 | Bennett et al. ............... 192/141 |
| 5,557,154 A * | | 9/1996 | Erhart .............................. 310/80 |
| 6,619,148 B2 * | | 9/2003 | Nishide ......................... 74/89.44 |
| 2004/0007426 A1 * | | 1/2004 | Keller et al. ....................... 184/5 |
| 2004/0061382 A1 * | | 4/2004 | Schreier ........................... 310/13 |
| 2004/0251239 A1 * | | 12/2004 | Hochhalter et al. .......... 219/86.1 |
| 2008/0258568 A1 * | | 10/2008 | Finkbeiner et al. ............. 310/12 |
| 2009/0260464 A1 * | | 10/2009 | Holker et al. ................ 74/89.33 |
| 2010/0067645 A1 * | | 3/2010 | Sakai et al. .................... 376/458 |

FOREIGN PATENT DOCUMENTS

| | | |
|---|---|---|
| GB | 914165 | * 12/1962 |
| WO | 2009/081034 | 7/2009 |
| WO | 2009/086831 | 7/2009 |

OTHER PUBLICATIONS

International Search Report and Written Opinion from PCT/US11/48438 dated Mar. 29, 2012.

* cited by examiner

*Primary Examiner* — William E Dondero
*Assistant Examiner* — Mark K Buse
(74) *Attorney, Agent, or Firm* — Calfee, Halter & Griswold LLP

(57) ABSTRACT

A mechanical actuator for translating rotational motion to linear motion. The actuator includes a motor, a screw assembly, a bearing assembly, and first and second lubrication systems. The screw assembly includes a housing, a threaded screw shaft disposed within the housing, a nut assembly, and an extension tube. The threaded screw shaft is rotatable by the motor. The nut assembly is arranged to move in either direction along a longitudinal axis of the threaded screw shaft when the threaded screw shaft is in rotational motion, thereby moving the extension tube between an extended position and a retracted position. The bearing assembly is arranged to provide support to at least a portion of a length of the threaded screw shaft. A pathway of the first lubrication system is remote and isolated from a pathway of the second lubrication system.

14 Claims, 22 Drawing Sheets

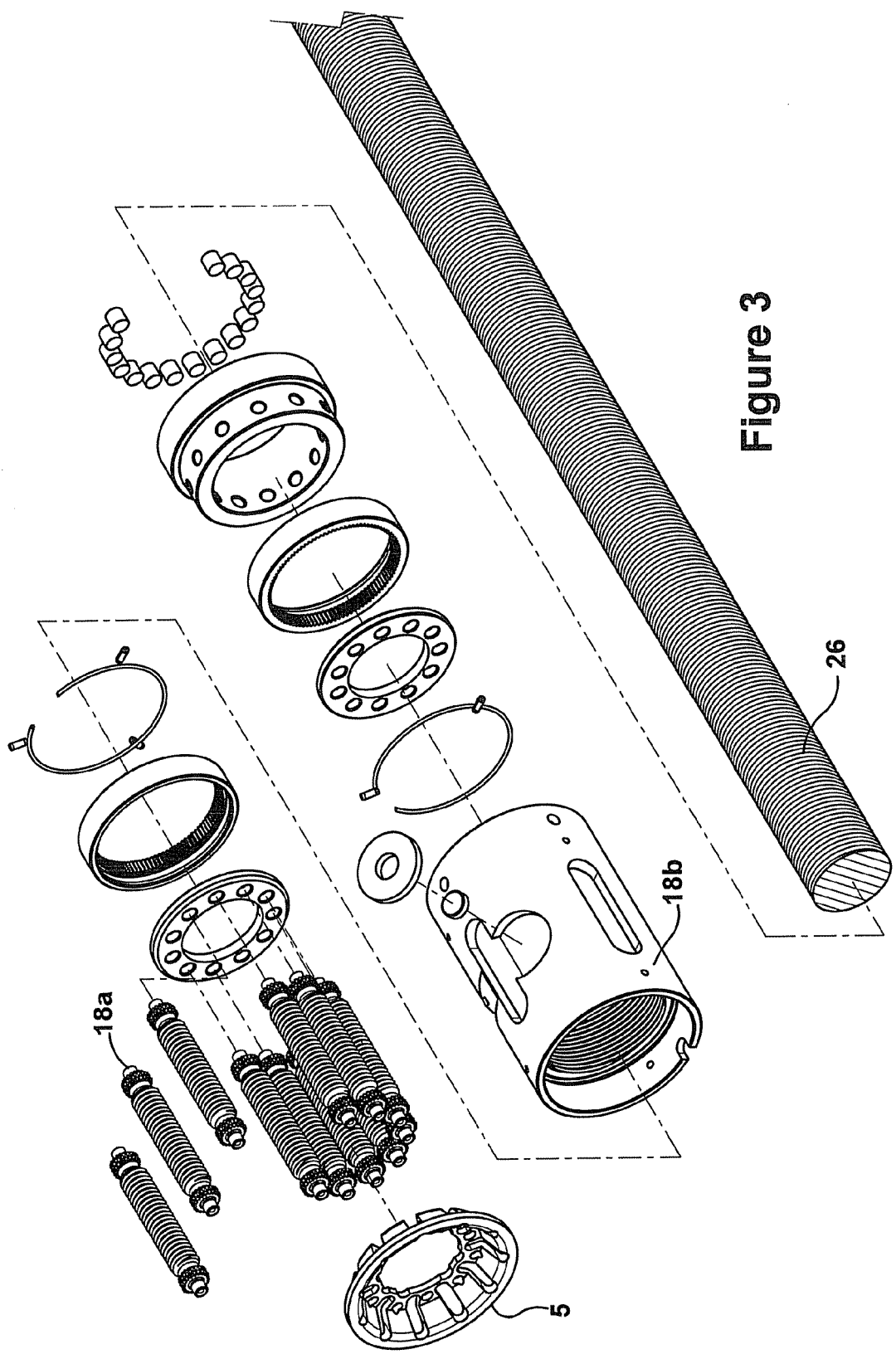

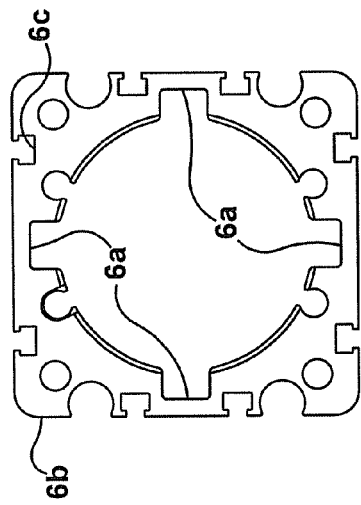
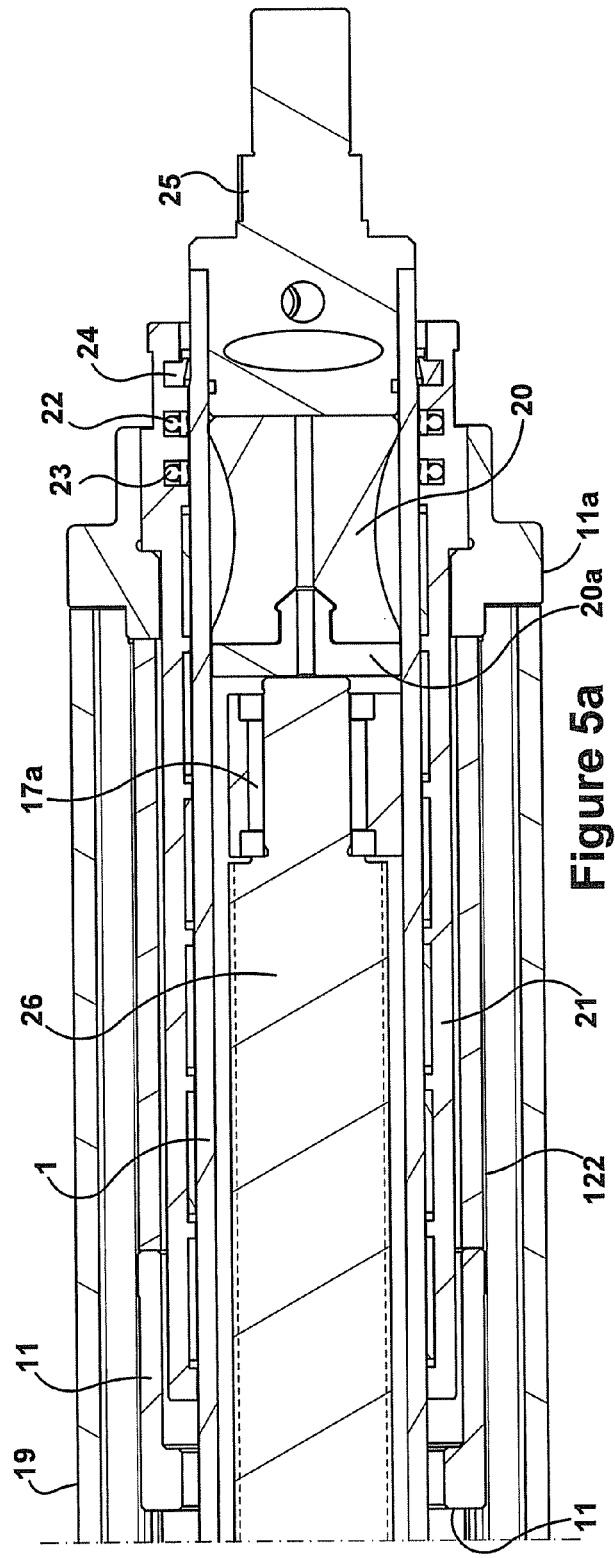

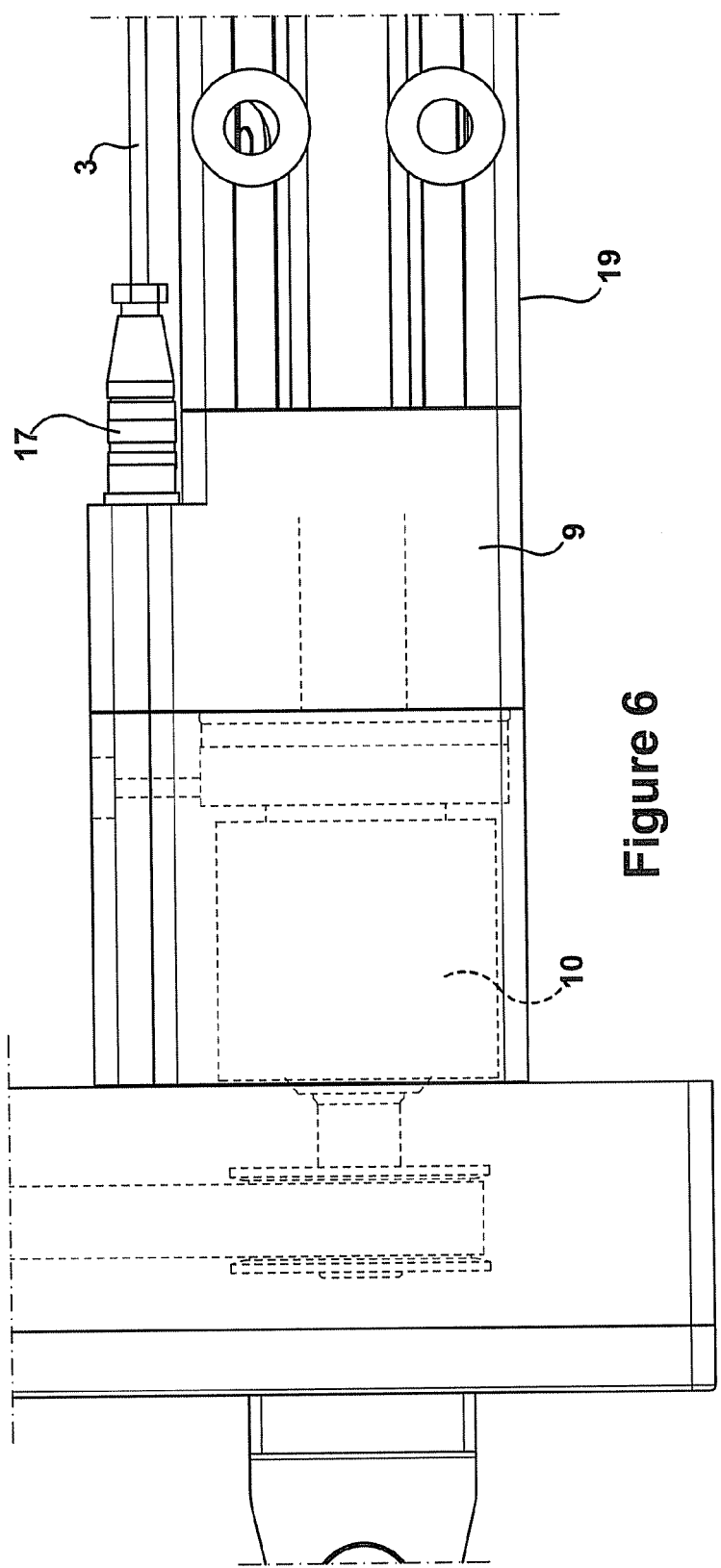

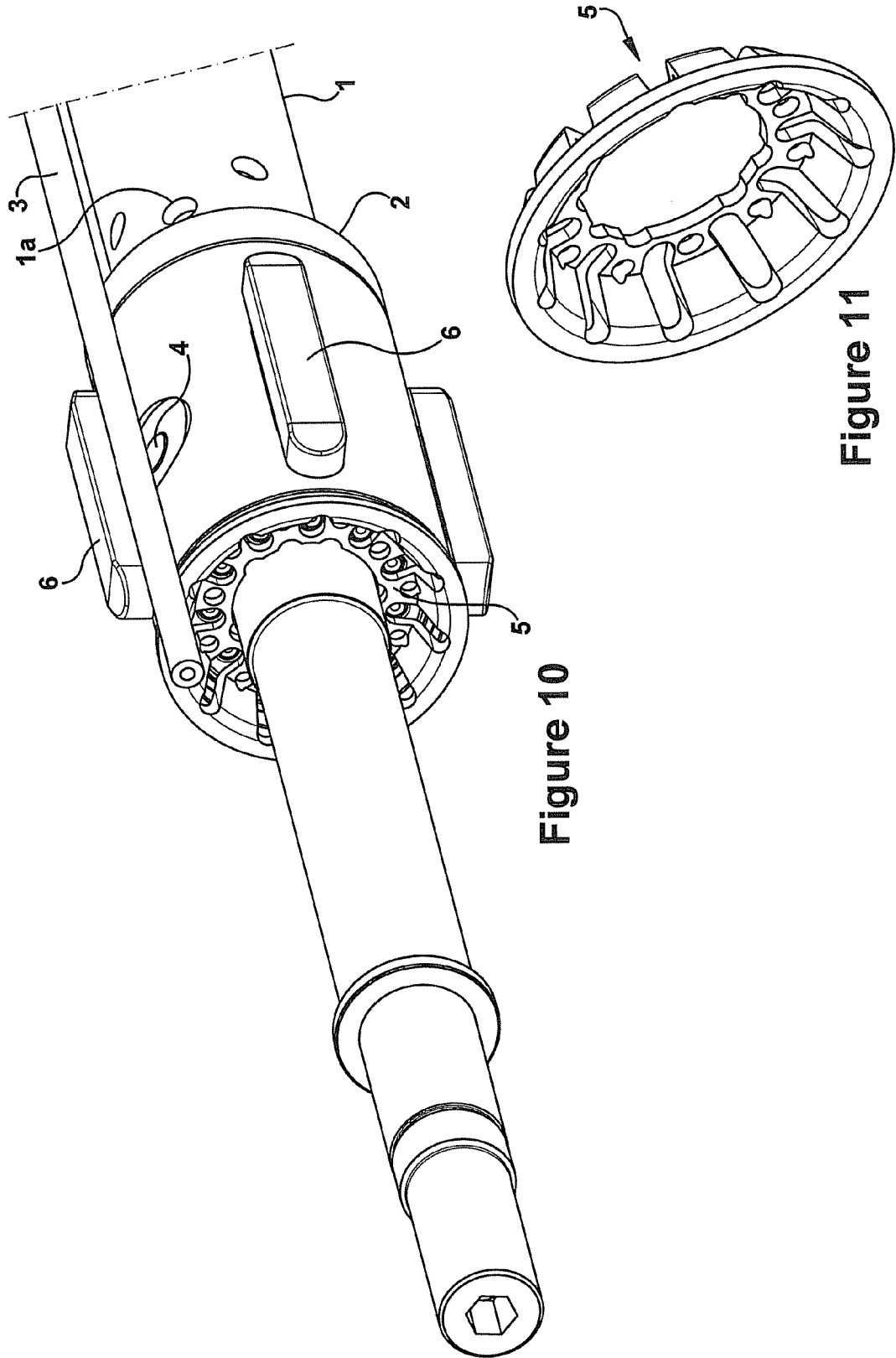

US 8,701,834 B2

MECHANICAL ACTUATOR

CROSS-REFERENCE TO RELATED APPLICATION

This application claims the benefit of U.S. Provisional Patent Application Ser. No. 61/375,432, entitled MECHANICAL ACTUATOR and filed Aug. 20, 2010, the entire disclosure of which is incorporated herein by reference, to the extent that it is not conflicting with the present application.

FIELD OF THE INVENTION

The present invention relates to a mechanical actuator having a synergistic design permitting multiple integrated systems for efficient and improved performance.

BACKGROUND OF THE INVENTION

Mechanical actuators of various construction and design, such as linear actuators, are well-known in the art. A linear actuator generally transforms rotational motion into linear motion and typically includes a threaded elongated screw or nut component powered by a rotational motion source. The screw or nut movement is converted by a piston or other means to produce linear back and forth cyclic movement of an output member, such as for example, a sliding or elongated tube.

A conventional linear actuator includes an electric motor that rotates an elongated threaded screw shaft. Such a design is a screw mechanism for converting rotary torque motion into linear motion, e.g., a roller screw, a ball screw or an acme screw. Roller screws can carry heavy loads for thousands of hours in demanding and continuous-duty conditions. The exemplary application requirements and others can cause several inherent problems in operation.

Roller screw actuators are susceptible to high-energy demand, wear of individual parts, excess debris, and actuator failure. Many of the failure modes of mechanical and electromechanical actuators are caused by insufficient or failed lubrication, and an inability to manage wear debris in a programmed or systematic manner. Other drawbacks of roller screw actuators exist caused directly or in part by limitations of conventional lubrication systems.

SUMMARY OF THE INVENTION

In an illustrated embodiment of the invention, a mechanical actuator is disclosed. The actuator includes a motor, a screw assembly, a bearing assembly, and a first and second lubrication system. The screw assembly includes a housing, a threaded screw shaft disposed within the housing, a nut assembly, and an extension tube. The threaded screw shaft is rotatable by the motor. The nut assembly is arranged to move in either direction along a longitudinal axis of the threaded screw shaft when the threaded screw shaft is in rotational motion, thereby moving the extension tube between an extended position and a retracted position. The bearing assembly is arranged to provide support to at least a portion of a length of the threaded screw shaft. The first lubrication system includes a first set of components and is arranged to provide lubrication to the screw assembly. The second lubrication system includes a second set of components and is arranged to provide lubrication to the bearing assembly. A pathway of the first lubrication system is remote and isolated from a pathway of the second lubrication system.

Further features and advantages of the invention will become apparent from the following detailed description made with reference to the accompanying drawings.

BRIEF DESCRIPTION OF THE DRAWINGS

In the accompanying drawings, which are incorporated in and constitute a part of this specification, embodiments of the invention are illustrated, which, together with the description of the invention serve to illustrate the principles of this invention. The drawings are not intended to and do not limit the scope of the invention or any subsequent claims in any way. Instead, the drawings only describe certain embodiments of the invention and other embodiments of the invention not described are encompassed by this disclosure of the invention.

FIG. 1b is a top view, partially in section, of a portion of the roller screw actuator of FIG. 1a;

FIG. 1c is a front sectional view of a roller screw actuator of FIG. 1a;

FIG. 3 is an exploded assembly view of a portion of the roller screw actuator of FIG. 1a, showing portions of the roller screw assembly;

FIG. 4 is a cross-sectional view of a screw housing of the roller screw actuator of FIG. 1a;

FIG. 5a is a cross-section view of the distal end of the actuator of FIG. 1a, partially in cross-section along the longitudinal axis of the actuator, showing a retraction jounce stop;

FIG. 6 is a cross-section view of a portion of the actuator of FIG. 1a, showing the load/torque sensor block and position transducer block;

FIG. 9 is a right front perspective view of the roller screw assembly of the actuator of FIG. 1a;

FIG. 10 is a left front perspective view of the roller screw assembly of the actuator of FIG. 1a, showing a lubricant impeller and the housing removed;

FIG. 11 is a perspective view of the lubricant impeller of FIG. 10;

FIG. 13 is front view, partially in section, of the actuator of FIG. 1a;

FIGS. 18 and 19 illustrate flow patterns adjacent the roller nut during extension and retraction of the actuator of FIG. 1a;

FIGS. 20 and 21 illustrate flow patterns adjacent the front bearing assembly during extension and retraction of the actuator of FIG. 1a;

FIGS. 22 and 23 are views of the load cell cartridge of the actuator of FIG. 1a;

FIG. 24 is a perspective view of the linear position sensor of the actuator of FIG. 1a;

FIG. 25 is a perspective view of the linear position sensor housing of the actuator of FIG. 1a;

DETAILED DESCRIPTION OF THE INVENTION

Figure 1A:
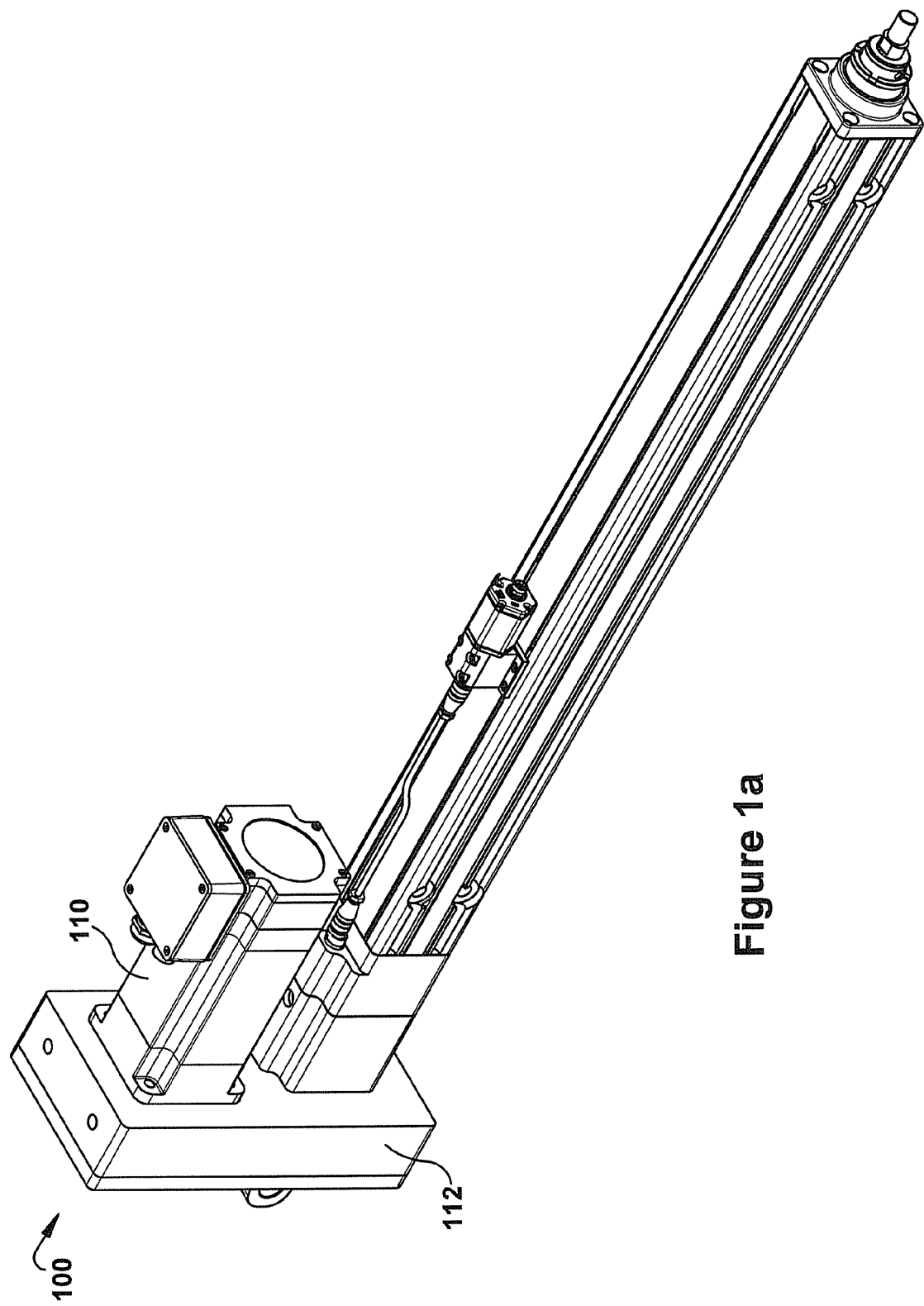
FIG. 1a is a front perspective view of a roller screw actuator.

This Detailed Description of the Invention merely describes embodiments of the invention and is not intended to limit the scope of the claims in any way. Indeed, the invention as claimed is broader than and unlimited by the preferred embodiments, and the terms used in the claims have their full ordinary meaning.

Electromechanical actuators are typically not able to run at the same duty cycle and lifetime as hydraulic cylinders. The inventive actuator has an integrated system to allow the electromechanical actuator to achieve performance levels typical of a hydraulic cylinder and control system, as evaluated from a performance, life, precision, duty cycle, and speed standpoint.

Discussion of Actuator

The inventive actuator is structured in an interactive arrangement of several integrated systems. The systems may be arranged to be dependable of one another and synergistically work together for optimum performance of the actuator.

A mechanical actuator includes two isolated lubrication systems, a first lubrication system for a roller screw and a second lubrication system for a proximal bearing. The isolated lubrication systems permit separate and optimum lubrication criteria, e.g., operating pressures, cleanliness standards, lubrication selections and maintenance schedules.

A lubrication system for the roller screw is fully contained within a distinct compartment remote from and distal to the bearing system. The lubrication system for the roller screw includes a lubricant impeller, four distinct and connected chambers, a set of Internal Lubrication System Components (MSC) and a set of External Lubrication System Components (ELSC).

A load/torque cell and lubrication system for the proximal bearing is included partially because of the lubrication system for the bearing being separate, this load/torque sensor, is mechanically possible—therefore, partially because of the bearing lubrication system the load/torque sensing exists. The load-torque cell is disposed near the proximal end of the actuator, and does not include any conventional exposed wires. The bearing lubrication system is remote and separate from the roller screw lubrication system.

The actuator includes an absolute position sensor, integrated magnetic components, and a trigger limit switch. This system features absolute position measurement capability, while permitting isolation of lubrication types and debris removal from the lubrication system for the roller screw as well as limit switch placement in almost any location (limit switch groove) on the housing.

A jounce stop/end of travel/shock management system operates to manage and control load. The jounce stop/end-of-travel/shock management system uses the presence and delivery system of the lubricant within the actuator to help dissipate the impact energy from a jounce.

A linear actuation device of the invention includes an electric motor that rotates an elongated threaded screw shaft. The shaft is secured within a housing. A nut is disposed on some portion of the shaft and is moved back and forth as the screw shaft rotates. The linear movement of the nut is transferred to an output component that is supported and partially guided within the housing or other suitable cover. As a result, the nut and screw shaft act as a piston assembly and the distal end of the output component subsequently provides oscillating linear motion.

In an inventive device, full cycle movement to opposing positions is not required, but rather any combination of linear left or right movement within the limits of travel. Further, the use of the term cycle is not limited to oscillating motion. In a preferred embodiment, operation of the power source creates linear back and forth motion of the output shaft in the opposing linear directions. Specifically, linear output generates movement through a roller screw to an extension tube. As can be appreciated by one with ordinary skill in the art, the specific construction of the rotational power supply, input shaft, the housing, and the output shaft can vary in the practice of the invention.

The invention will be discussed in regard to a roller screw actuator for exemplary purposes. It should be apparent to one with ordinary skill in the art that the invention can be practiced with other types of actuators, such as for example, acme screw and ball screw designs. A roller screw offers a very high speed long life and may represent the most difficult case design. The invention has a wide parameter of applications, including applications in which actuator is installed in descending or inclined non-horizontal positions, harsh environments in which leak path lubrication is typical, and applications requiring "return to home" features, such as for example, the wind power industry.

The function of an exemplary roller screw actuator will now be discussed. Referring now to the drawings, FIG. 1a is a front perspective view of a roller screw actuator 100. The main parts of the actuator externally visible are identified in FIG. 1a. In discussing the actuator of parts thereof, when using the terms distal and proximal, the terms are used with respect to the rotational power source. In other words, the left hand side of FIG. 1a is the proximal end of the actuator, and the right hand side of FIG. 1a is the distal end of the actuator.

Conventionally, the proximal side is sometimes referred to as the rear, and the distal side is sometimes referred to as the front. The actuator is assembled from the proximal end to distal end along a longitudinal axis, including the pulley housing components, the load cell housing components, the linear position sensor housing components, the screw housing components, and actuator distal end components.

The actuator 100 is powered by a motor 110 connected to a proximal housing 112 of the actuator. Electrical power supplied to the motor causes a pulley on the motor to turn, thereby causing a belt to move, which subsequently turns a second pulley mounting below the first pulley. The second pulley is positioned essentially coaxially along a longitudinal axis of the actuator. The second pulley drives a roller screw 26 best seen on FIG. 2, a sectional view of the proximal end of the actuator. As rotational torque is transmitted to the roller screw, the roller screw 26 turns in a rotational direction about a longitudinal axis $L_s$ of the roller screw.

The roller screw is arranged to transmit force to an extension tube 1 by way of a roller screw assembly 18. The roller screw assembly 18, in addition to the roller screw 26, includes a plurality of rollers 18a that are spaced around a circumference of the roller screw 26. An exploded view of portions of the roller screw assembly 18 and adjacent actuator components is shown in FIG. 3. As the roller screw 26 rotates within the roller screw assembly, the rollers 18a are rotated, between the convex surface of the roller screw and the concave inner surface of the housing 18b of the roller screw assembly 18. However, the roller screw assembly 18 is prevented from rotation by anti-rotate blocks 6, best seen in FIGS. 9 and 10. As such, the rollers 18a rotate in an alternating pattern to generate linear back and forth movement of the extension tube 1 relative to the proximal end of the actuator, i.e., the roller screw assembly 18 and roller screw 26 act as a piston.

Figure 9:
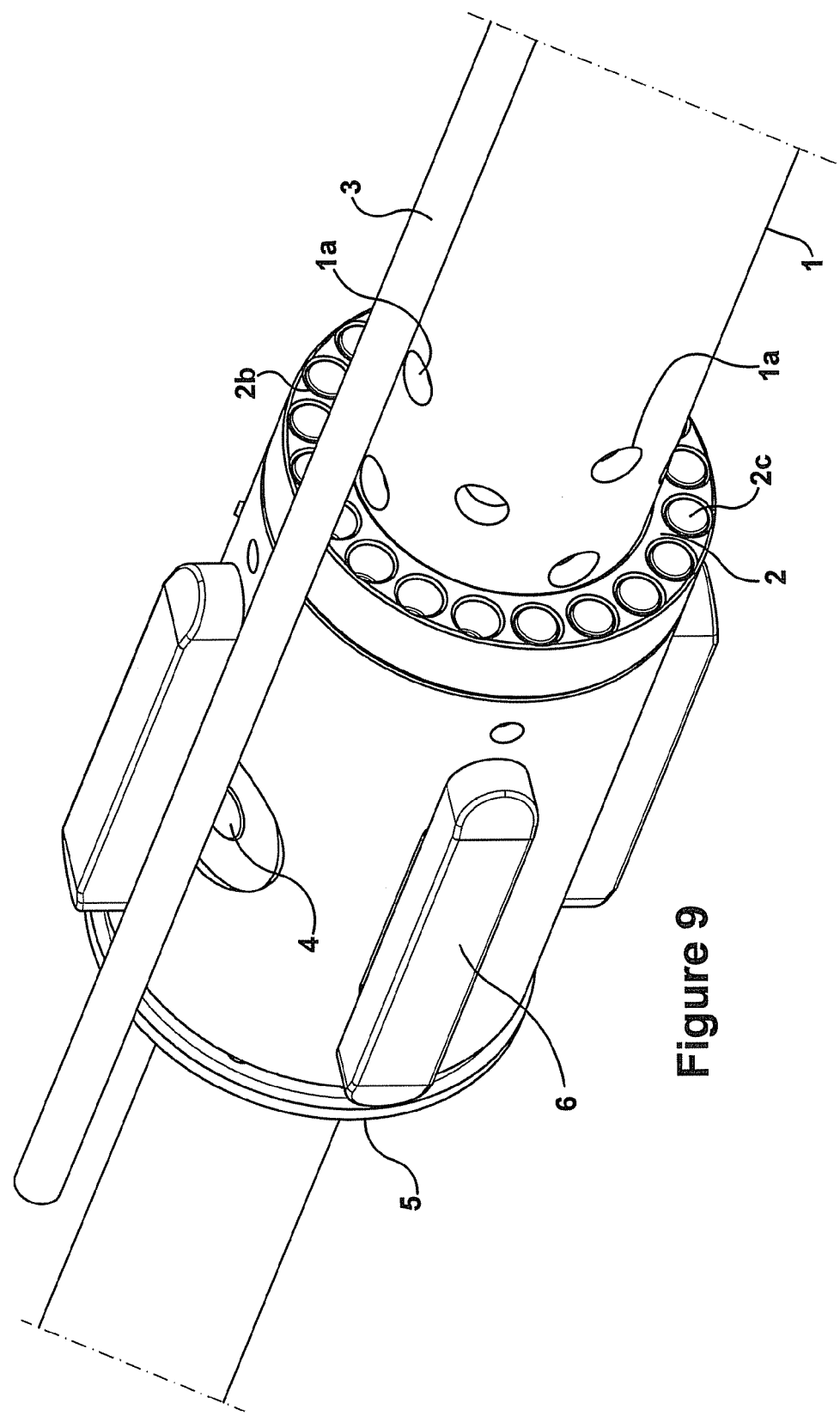

As discussed, four anti-rotate blocks 6 are shown in the embodiment illustrated in FIG. 9. It should be apparent to one with ordinary skill in the art that the number and position of the anti-rotate blocks on the outside of the roller screw assembly may vary in the practice of this invention. In the assembled actuator, the blocks 6 are positioned parallel to the longitudinal axis $L_s$ and within concave slots 6a of a screw housing 6b, as shown in the cross-sectional view of FIG. 4. Further, the embodiment shown can be operated safely and efficiently without anti-rotate blocks 6. An operator may chose to prevent rotation of the extension tube by a clevis connection or the like. Alternatively, an operator may permit the output of the actuator to follow a rotating motion, such that as the extension tube 1 leaves the actuator, the extension tube it is not prohibited from rotation. In some applications, the actuator 100 may slightly rotate in use. For example, the extension tube may rotate up to 10 degrees due to the item that the actuator is driving. With removal of the anti-rotate blocks 6, an operator may use the inventive actuator in such an application. Without the ability to delete the anti-rotate blocks in certain applications, damage could occur to the anti-rotate blocks 6, or other portions of the actuator.

Returning to the linear movement of the actuator 100, the extension tube 1 moves back and forth as a result of the roller screw 26 driving the roller nut assembly 18. To enable this movement, the roller screw 26 is supported in two places on either side of the roller screw assembly 18. The first support location is a bearing assembly 14, i.e., the load torque cell 10, load bearing cartridge 14b and associated lubrication components. The roller screw 26 is also supported by the front high speed bearing assembly, located at the distal end of the roller screw 18 adjacent the retraction jump stop assembly 20 (see FIG. 5a). Thus, as arranged and positioned, the roller screw 26 is supported between the rear bearing 14 (proximal), the roller nut assembly 18, and the front bearing 17a (distal).

As the extension tube 1 moves linearly back and forth, various other features of the actuator are engaged. To be discussed later in greater detail, two isolated lubrication systems of the actuator 100 are in effect. The two lubrication systems are intentionally separate and remote in the actuator such that the proper lubrication systems can be applied to the proper moving components, i.e., (1) the roller screw lubrication system, and (2) the load/torque sensor torque cell and associated lubrication system for the rear bearing.

As the roller screw 26 rotates, the rear bearings with assembly 14 support the screw shaft as low pressure seals 15 hold the lubricant in place. The seals 15 keep the lubricant clean and isolated from any containments originating from outside the chamber. The seals 15 also prohibit lubricant from leaving the chamber that otherwise may leave as a result of thermal expansion.

The load cell and bearing assembly 14, also shown in FIG. 6, holds and contains the axial thrust of the roller screw 26, as well as the side load generated from the belt tension on the pulley that is attached to the proximal end of the roller screw 26. This feature of the actuator permits other advantageous arrangements. Referring again to FIG. 2, a Belleville washer 16a and Belleville spacer 16b are located in an area in which the assembly 14 is secured to generate preload and reduce lash to zero as well as have the ability to actively absorb shock loads to the screw from the extension tube through these springs. A relatively small safety gap 10a exists between assembly 14 and the actuator housing. An exemplary gap may be 0.030 inches (note that this gap is radial, whereas the Belleville washer gap is axial) circumferentially around assembly 14. In this reference, the actuator housing generally refers to external supporting structure which includes the position transducer block 9 and the load/torque sensor block 10, which are best seen in FIG. 6. However, the load/torque sensor block 10 is supported only by the Belleville washer 16a and Belleville spacer 16b at a collar 10d of the load torque cell 10. By this arrangement, the force path is only through the load torque cell 10.

The safety gap 10a has another benefit related to unexpected failure. As stated, a safety gap 10a exists between assembly 14 and the actuator housing. The clearance allows assembly 14 the ability to flex, and thus, measure the force and the torque. However, if a failure of the load torque sensor occurred, which is designed not to fail but rather to have a failsafe, the safety gap 10a would close as the assembly 14 would deflect to the point it took up the clearance in the safety gap 10a. As a result, the actuator would continue to operate in a faulted condition, but without having a catastrophic failure. The actuator 100 would still hold the load in place, but it would operate with higher friction, increased vibration, and increased physical wear. However, the actuator 100 would not drop or lose control of any engaged load.

The assembly 14 is beneficial for measurements of actuator performance parameters. Specifically, assembly 14 is instrumented such that the axial thrusts are able to be measured through strain gauging the narrow section of the load bearing cell 10, and also due to the belt tension that results from torque from the motor. The side loading is also measured through the load cell narrow section with a different set of strain gauges, such that the assembly functions as a both torque and load sensor element.

This arrangement has several benefits over prior art actuators. The physical arrangement described allows monitoring of, through measurement and calculation, the relationship between the input torque and the output force, i.e., the efficiency of the actuator. An operator may measure how hard the roller screw assembly is pushing back on the extension tube because the resulting load flows back in the proximal direction through the bearings. The arrangement also allows the operator to understand how much torque is being applied to generate the output force, without having to directly measure the input torque. The ratio of input torque to output force can be used to monitor performance in other ways as well. The described method measures only the load of the actuator, without a requirement to measure the input torque. Conventional electromechanical actuator require measurement of the input torque.

Assembly 14 also offers a "no zero drift" arrangement as a result of the manner in which the assembly is supported. As such, the illustrated embodiment is an absolute forced measurement system instead of a relative measurement system. Conventional actuators have measurement systems that can either be unit directional only, or can be a relative force measurement system only. However, the illustrated actuator 100 has no zero drift because only one force is back through assembly 14 toward the proximal end of the actuator. In other words, all the load is taken through one flow path from the shaft through the bearings, and through the bearing lubrication system (load torque sensor) collar.

Figure 2:
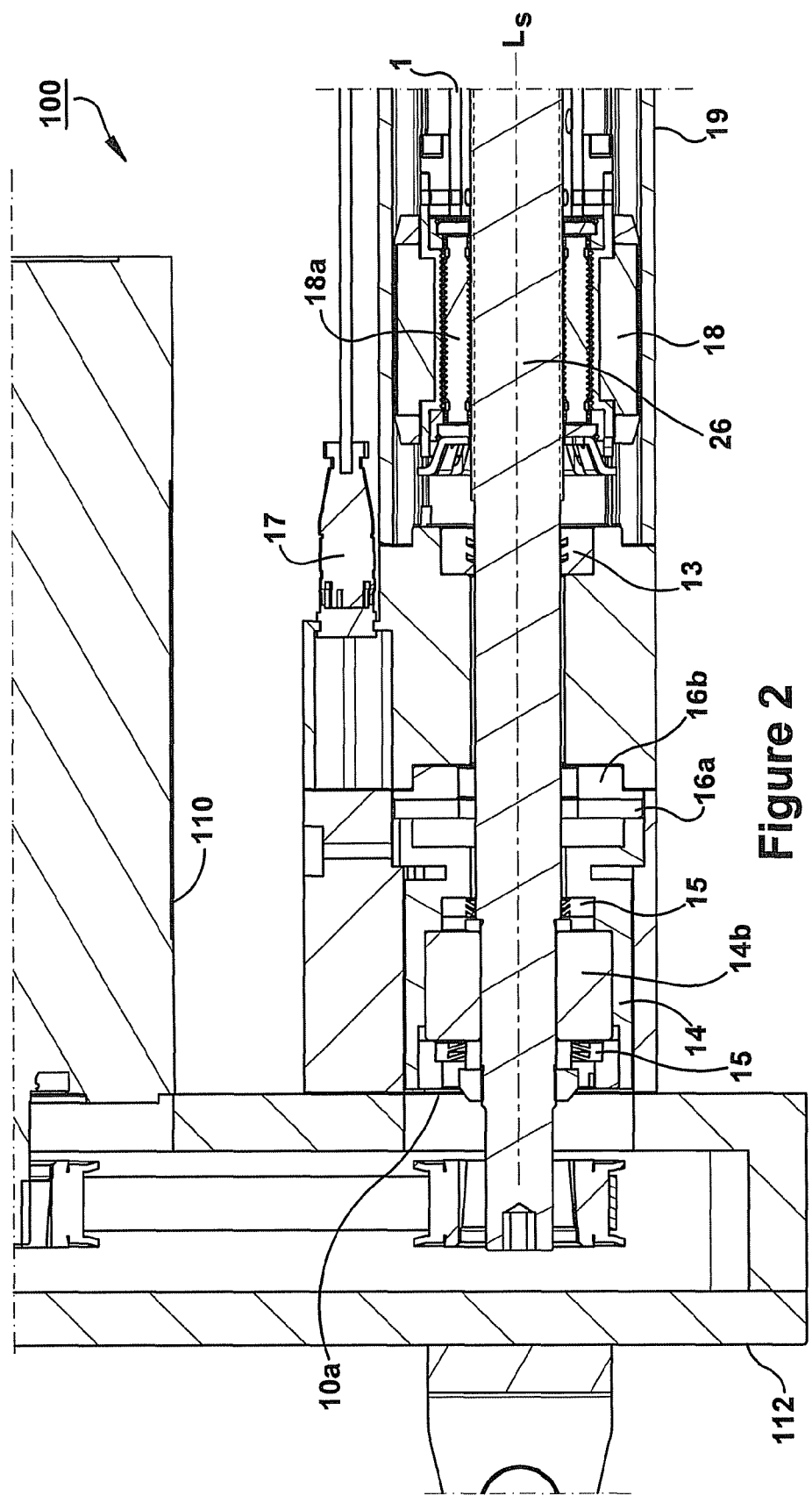
FIG. 2 is a cross-sectional view of a portion of the roller screw actuator of FIG. 1a, showing the proximal end of the actuator.

The lubrication system of assembly 14 is a completely isolated cartridge style lubrication system. The arrangement of the assembly 14 prevents lubrication from entering or exiting this section of the actuator 100. Thus, the actuator operating life is extended and predictable. A fluid free zone (designated as R3 in FIG. 14) is disposed between the high pressure section R4, which is the section where the roller screw, the roller nut assembly resides and the extension tube resides, and the assembly 14 section R2, the section of the load torque zone bearing cartridge. The fluid free zone R3 is disposed such that a clear demarcation exists between the high pressure and the low pressure zones of the actuator 100, i.e., between the roller screw lubrication system and the bearing lubrication system. As seen in FIG. 2, the position of the high pressure seals 13 are important to keep the high pressure lubricant in the roller nut screw assembly zone. Six different lubrication levels, to be discussed later in further detail, require the provision for high pressure seals rather than low pressure seals.

Figure 1B:
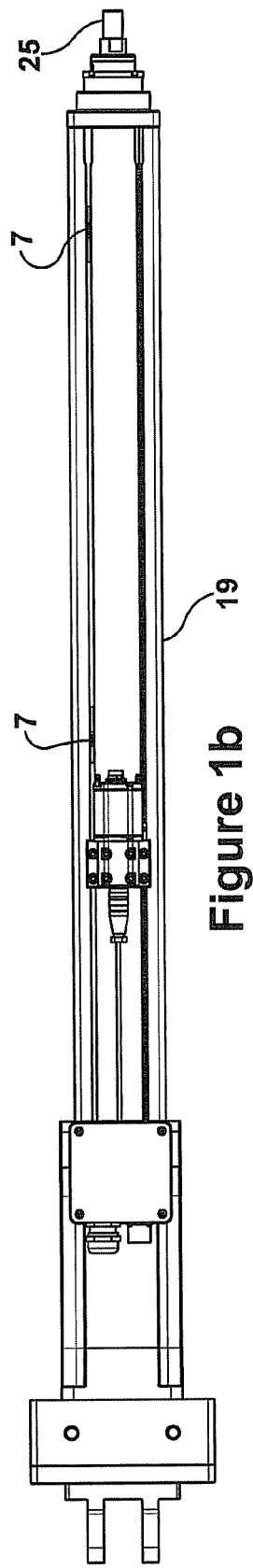

The function of the roller screw 26 will now be discussed in additional detail in regard to the roller nut assembly 18. A right front perspective view of the roller nut assembly is shown in FIG. 9, and a left front perspective view is shown in FIG. 10. As illustrated, the roller nut assembly and adjacent components include the anti-rotate blocks 6, a pin ring 2, the extension tube 1 with a plurality of lubrication ports 1a, a position sensor rod 3, at least one position sensor magnet 4, and a limit switch 7 (best seen in FIG. 1b). As seen in FIG. 6, the position transducer block 9 is located on the immediate proximal side of the roller screw assembly. A high pressure gasket (not shown) is positioned on the distal side of the face of the position transducer block 9 and forms a seal between the position transducer block 9 and the actuator housing 19 (effectively forming the end of the high pressure zone, and the start of the fluid free zone). The distal surface of the pin ring 2 includes a plurality of mounting pockets 2b, each sized for a magnet 2c.

As the roller nut assembly 18 moves linearly back and forth along the longitudinal axis $L_s$, the extension tube 1 remains connected to the roller nut assembly 18 through a joint formed by the pin ring. In the preferred embodiment, the pin ring 2 is welded to the extension tube 1. The pin ring 2 is then inserted into the roller nut assembly 18 and pinned such that the roller nut assembly 18, pin ring 2, and extension tube 1 are in extremely tight alignment to allow all movement essentially only along the longitudinal axis L.

The magnets 2c are positioned inside of the distal face of the pin ring 2 in the pockets 2b shown. In the preferred embodiment, the face includes 18 pockets equally spaced about the circumference. All but two of the pockets contain a magnet. Two pockets are left empty so as to not introduce magnets that may interfere with the position sensor magnet 4. Specifically, the direction of polarity of position magnet 4 has the north pole facing radially outward, whereas the pin ring 2 with magnets 2c has the polarity facing with the north pole towards the end, the distal end of the extension tube 1. This contrast will be discussed later in more detail.

The magnet positioning within the actuator 100 has other benefits. The position magnet 4 is disposed such that the position sensor rod 3 is actuated by the position sensor magnet 4. Therefore, the absolute position of the roller nut assembly 18 is measured in relationship to the axial position of the actuator housing 19. With the motion of the roller nut assembly 18, the pin ring 2 also moves and the magnets 2c are orientated such that they trigger a limit switch 7. In the practice of the invention, any number of limit switches can be installed on the actuator and any magnetic arrangement can be used on the pin ring 2. The flexibility to place limits 7 in any or all of the slots 6c in the actuator housings 6b, 19 allows the operator to gather more data or perform additional motion control regarding performance in light of the operator's unique needs or application environment.

Another important feature of the actuator 100 resulting from the back and forth movement of the roller nut assembly 18 with the housing 19 involves the lubricant impeller 5. As seen in FIG. 10, the lubricant impeller 5 is positioned on the proximal side of roller nut assembly 18. The lubricant impeller, shown in FIG. 11, is rotated with carrier plates at about half the speed of the roller screw 26. The lubricant impeller 5 is shaped to spray, distribute, and pump lubrication fluid, e.g., from a radial direction to an axial direction within the high pressure lubrication system on the actuator 100. In other words, the ventilated carrier plate inside the roller nut assembly, and the design of the lubricant impeller 5, permits the impeller 5 to push fluid axially and radially fling fluid or lubricant outwards, such that it is ventilating and pulling fluid through the roller nut assembly 18 and distributing lubricant to all the components. The impeller also acts to homogenize temperature inside the actuator.

The lubrication fluid enjoys other paths in the distal portion of the actuator. As mentioned, the extension tube 1 include lubrication ports 1a. In operation, lubricant flows in and out of the lubrication ports 1a, traveling within the extension tube 1 to lubricate the roller screw shaft 16, the front shaft bearing 17a, a retraction jounce stop assembly 20, and an extension jounce stop 11 as well as seals. The lubrication ports 1a jet fluid radially as well. This lubrication system bathes these items with fluid such that, when they are engaged and in movement, fluid is pumped by the engagement of the moving parts, with the fixed jounce stops 11 causing a damping effect. As a result, the motion is attenuated in a controlled manner. Further, the lubrication system results in debris capture in the roller screw section of the actuator. Debris is trapped on the magnets 4, 2c. In operation, (per design where the debris is passed to the magnets in the low fluid velocity zone of the actuator) the fluid velocity within the system is low enough such that debris is not washed from the magnets after initial capture. Rather, debris is held to the magnets as a result of the controlled method that the lubricant is transferred throughout the high-pressure portion of the actuator. To be discussed later in further detail, a four-chamber lubrication system exists during operation of the roller screw 26. As fluid jets from the lubrication ports 1a, fluid contacts and covers the anti-rotate blocks 6. The fluid acts to lubricate and cool the blocks 6.

The actuator includes many important non-moving parts, such as the high pressure gasket 8 that seals the unit. Several of these gaskets are disposed throughout the system to seal the actuator and prevent leaks (see FIG. 1b). The distal section of the actuator can tolerate a high pressure, such as for example, up to 1500 psi. The manner in which certain electrical signals are collected within the actuator further also permits high pressure operation. The position of the electrical connection 17 (see FIG. 2) for the position transducer enables the system to be leak free. Specifically, the electrical connection 17 for the position transducer creates a path to receive a signal from position sensor rod 3 out to the outside of the actuator without causing any breach in the sealing system. As discussed, the linear position transducer magnet 4 runs parallel to the sensor rod 3, with the rod embedded in a pressurized lubrication system of the actuator 100. As positioned, the magnet 4, connection 17 and rod 3 are off-center from the rotational axis of the roller screw 26. Conventionally, one or more of these devices are on-center in an electromechanical actuator or located outside the unit. In the preferred embodiment, despite being positioned radially off-center, the magnet 4, connection 17 and rod 3 function to collect the position signal from the unit, while having the integrated magnets 2c captured debris and trigger limit switches 7 in a separate system from the position transducer.

Another inventive aspect of the sensor rod 3 positioning will now be discussed. The sensor rod 3 is supported along its entire length by the actuator housing 19. Thus, the sensor rod is operational in any orientation or at any angle. Further, the rod is relatively unaffected in an extreme vibration environment, so that the rod is prohibited from movement, shaking and damage.

Movement of the roller screw assembly 18, and subsequent back and forth linear movement of the extension tube 1, effects internal pressures in the actuator 100 and the roller screw chamber. As the extension tube 1 moves back and forth linearly, pressure due to volume changes in the actuator 100, i.e., static pressure in the actuator changes. For example, if a gauge were placed on the actuator housing 19 and vented to the atmosphere, so a gauge pressure (psi gauge) were taken, the pressure in the actuator 100 would go up as the extension tube enters the actuator, i.e., retracts, and it would go down as the extension tube exits the actuator, i.e., extends. This feature is discussed later in more detail.

An operator can vary the amount of air and lubrication fluid that is placed in the actuator. By management of this air/fluid ratio, the pressure differential can be changed in a programmed manner and therefore force fluid to leave or enter the actuator due to the static pressure changes (if connected to the external lubrication system components). With the extension tube moving back and forth, dynamic pressure changes also happen inside of the actuator. These changes may or may not affect the overall static pressure inside the actuator. In most cases, they do not affect the static pressure, but it can affect the local pressures. By design, the dynamic pressure changes do cause fluid to move within different chambers of the actuator. When certain chambers are high pressure, others by design are low pressure, and therefore dynamic pressure differentials are created to force fluid in a programmed repeatable manner. As mentioned, the roller screw lubrication system of the actuator 100 has four internal chambers.

Figure 12:
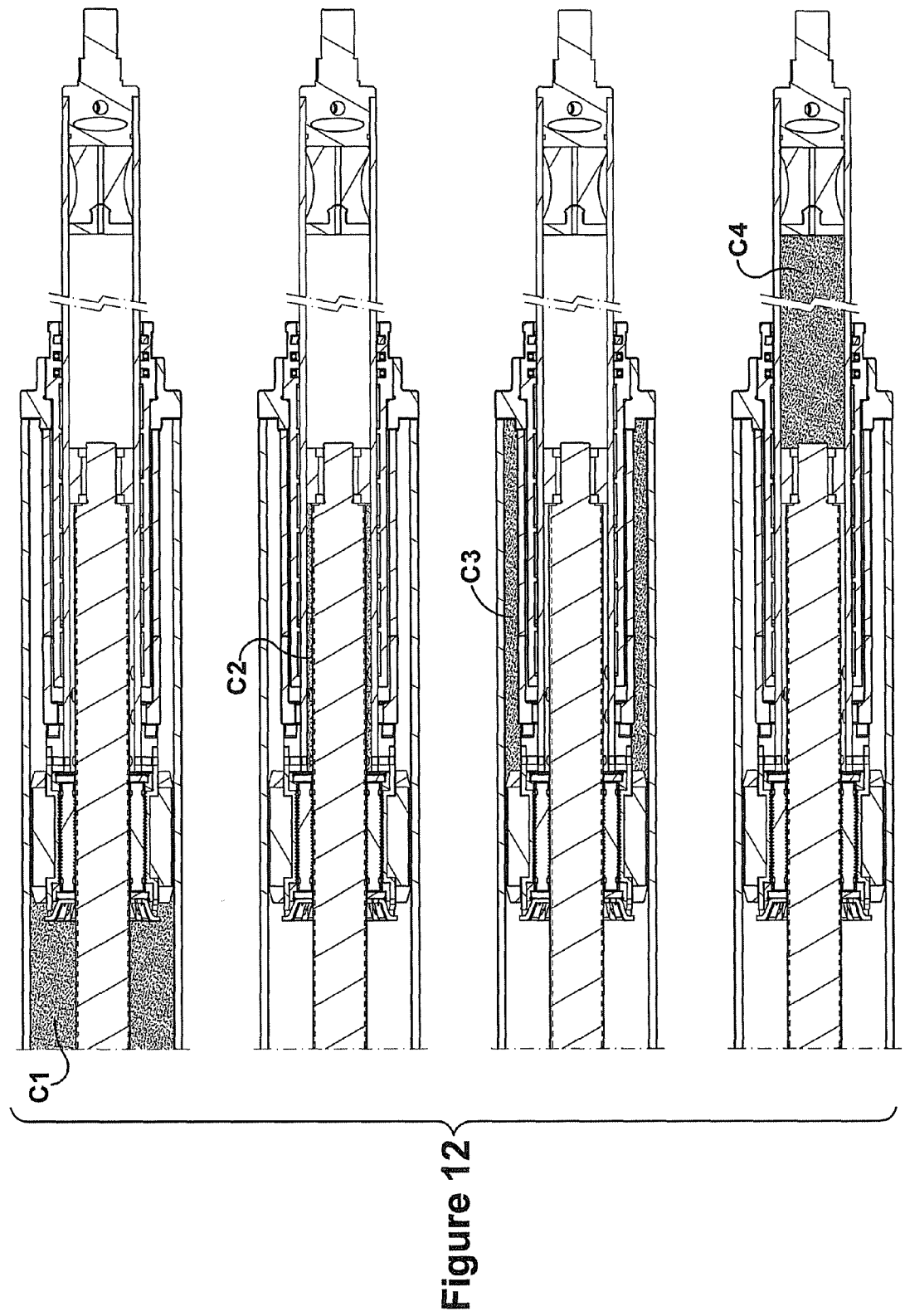
FIG. 12 is a series of cross-sectional views of the actuator of FIG. 1a, each view showing one of four lubrication chambers within the screw housing.
Figure 13:
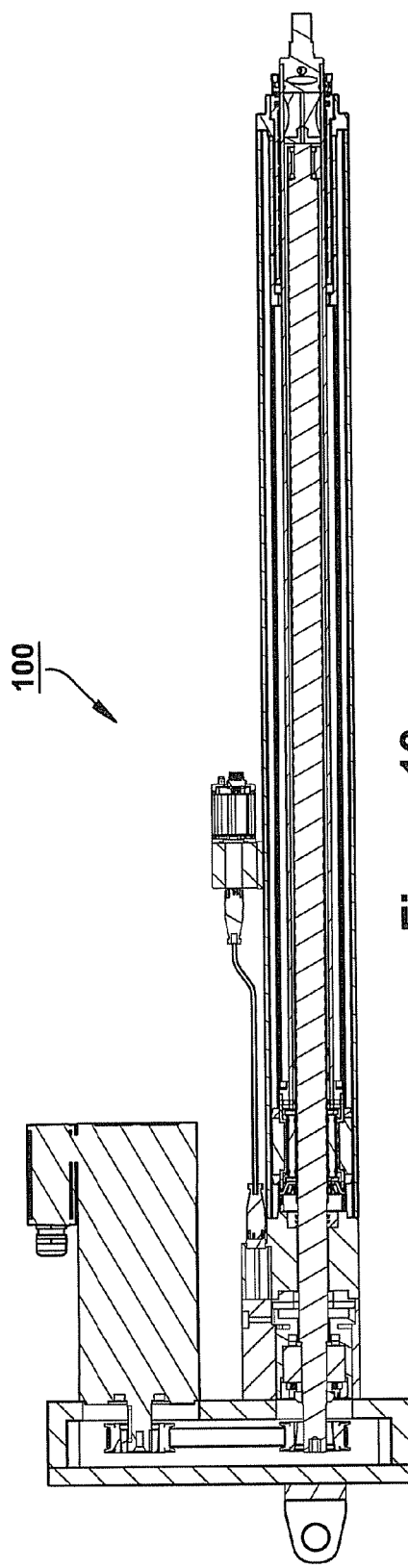

Returning again to movement of the extension tube 1, the next discussion will begin with the extension tube in the retracted state, or in a far proximal position. As the extension tube 1 moves outward distally, the dynamic pressure in certain zones noted begins to drop and fluid begins to flow over the roller nut assembly 18 and through the lubrication ports 1a. As discussed, the fluid flows around the roller nut assembly 18, through the roller nut assembly 18 on the outside of the extension tube 1 and on the chamber inside of the extension tube 1, and between the roller screw 18 and the inside diameter of the extension tube 1. The structure constituting this movement within the four chambers C1, C2, C3, C4 is illustrated in FIG. 12. The dynamic fluid movement inside the actuator is constantly redistributed as the extension tube 1 extends and retracts, causing fluid to be forced into all the chambers of the actuator in a programmed manner, to be discussed later in more detail.

With lubrication throughout the system, all appropriate parts at the distal end of the actuator remain lubricated. For example, a rod gland 21 in operation, with its accompanying wear bands and seals, remains cool and lubricated. With dynamic fluid movement, the actuator may achieve long life and maintain tight clearances and minimize thermal expansion throughout the entire actuator, because temperatures are homogenized via the continuous flow of fluid. As a result of the fluid flow, the chambers containing jounce stops are also exposed to fluid. As seen on FIG. 5a, the actuator 100 includes an extension jounce stop 11 and a stop tube 122, which compensates for different lengths of a rod gland 21, and a retraction jounce stop 20. The jounce stops function to contact a specific respective surface, the retraction jounce stop 20 contacts the end of the roller screw 26 when it is in use, and the extension jounce stop 11 contacts the roller nut assembly 18 (pin ring) when it is in use. When either of those jounce stops 11, 20 contact or mate components which have sufficient mass and speed, the jounce stops compress. Under compression, the shape of either jounce stops changes. With the shape changing in the orientation used, fluid is forced from one chamber into the other and thus is an integral part of the lubrication system. To illustrate the transfer of fluid, the retraction jounce stop 20 will be discussed.

The retraction movement of the extension tube 1 will now be discussed. During retraction, the extension tube 1 moves toward the proximal end of the actuator 100. This movement causes the proximal end of the jounce stop 20 to contact the end of the roller screw 26. Upon contact, axial displacement of the jounce stop 20 occurs which begins to compress the jounce stop 20. The parabolic like-shape of the jounce stop 20 outer surface moves radially outward against the inner diameter of the extension tube 1. As a result, fluid previously adjacent the jounce stop 20 is forced in two directions, through a gap between the jounce stop 20 and a rod end 25 and also through a proximal end of the jounce stop assembly. A washer like device 20a with a nose is pressed up inside of the jounce stop 20, to function like a pintle in a pintle valve. Thus, the impact of the roller screw 26 causes the radial motion of the jounce stop viscoelastic material to pump fluid from these chambers back against the direction of motion, and allows the jounce stop 20 to function as both a viscoelastic spring and a damper using the characteristics of the lubrication system. These two actions combine to produce damping, i.e., dissipates energy of the impact of the extension tube 1 movement.

The spring-like behavior of the compressive section of the retraction jounce stop 20 pushes the moving parts back toward the proximal end of the actuator after the impact duration is over. Therefore, the jounce stop 20 takes its initial shape. As mentioned, the outside diameter of the jounce stop 20 creates a seal against the extension tube 1, which acts like a variable orifice so that the lubrication fluid is forced to jet around a very tightly held interface. This fluid effect creates a damping feature. Once the compressive load is removed, the jounce stop 20 breaks that seal against the inner diameter of the extension tube 1, allowing fluid to replenish back into the chamber surrounding the jounce stop 20, in preparation of the next cycle of compressive movement. In the preferred embodiment, the jounce stop 20 requires the roller screw lubrication system to perform at maximum efficiency. In this manner, the lubrication system is integral with the jounce stop performance.

The extension jounce stop 11 functions similar to the retraction jounce stop 20 with a somewhat different arrangement. However, both the extension and retraction jounce stops 11, 20 can be replaced relatively easily. The extension jounce stop 11 can be replaced by simply removing an end cap 11a on the distal end of the actuator. With the rod end 25 removed, the retraction jounce stop 20 can be replaced. This feature is unique because both the extension and retraction jounce stops 11, 20 can be replaced without having to completely disassemble the unit. In a conventional actuator, any retraction stops are located near the proximal end of the actuator, which essentially require complete disassembly of the actuator for removal.

Figure 5B:
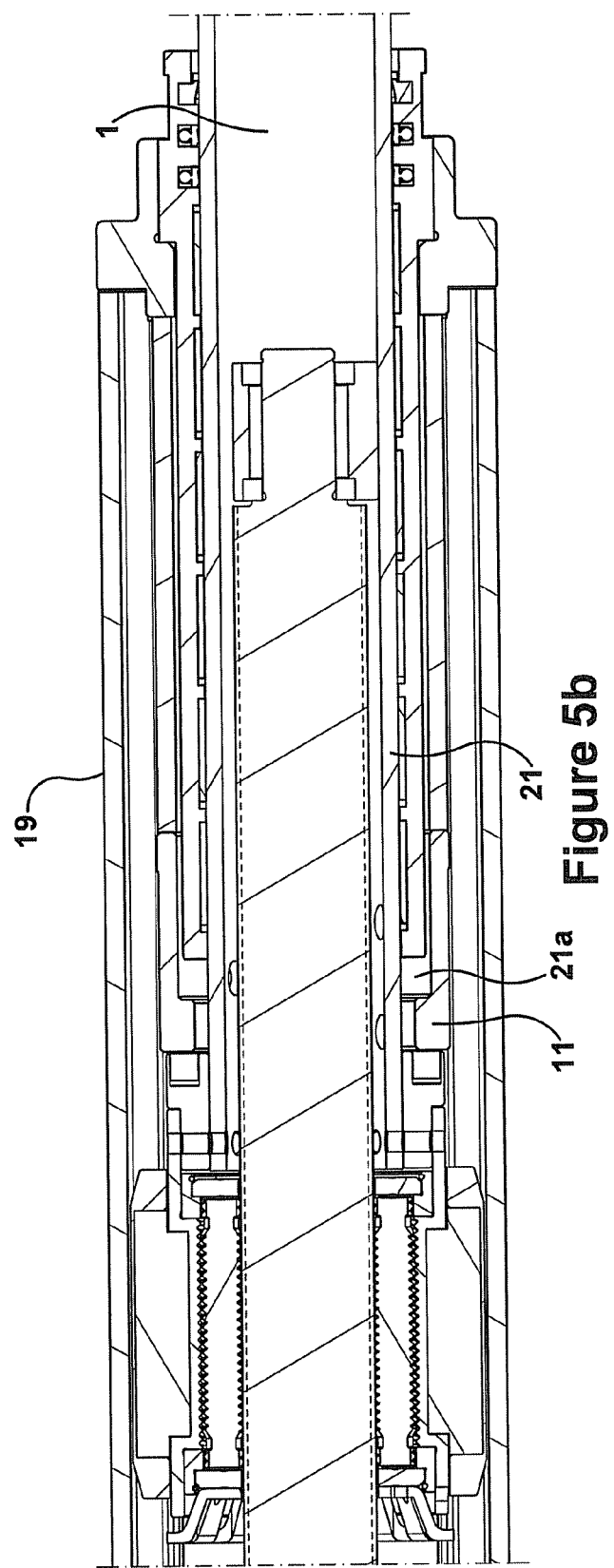
FIG. 5b is a cross-section view of a portion of the actuator of FIG. 1a, along the longitudinal axis of the actuator, showing an extension jounce stop.

As shown in FIG. 5a, the extension jounce stop 11 is disposed distally from the roller nut assembly. Upon compression on the proximal most face of the extension jounce stop 11 with the pin ring 2 of the extension tube 1, a seal begins to form between the pin ring and the extension jounce stop. As the jounce stop 11 compresses, the jounce stop moves distally and the distal shoulder of the jounce stop 1 in the shoulder area moves toward a rod gland 21. When the jounce stop 21 has moved about half of its motion length toward the rod gland 21, the portion of the jounce stop 11 that goes around the rod gland 21 has essentially filled a chamber 21a between the rod gland and jounce stop with viscoelastic material.

The sealing effect of the extension jounce stop 11 differs from the retraction jounce stop 20. The seal between the pin ring 2 and the proximal face of the jounce stop 11 is not as hydrodynamic, nor as tight of a seal as formed by the retraction jounce stop 20. No significant pressure can build at the proximal face of the jounce stop 11. However, as the thin section of the jounce stop 11 begins to fill the void 21a between the rod gland 21 and the housing 19, an advantageous locking occurs. As the void 21a is filled, pressure is generated, which injects lubrication fluid from the remaining small passage between the item 11 and the rod gland item 21 and the jounce stop 11 and the housing 19. As a result of the fluid being forced from these volumes, a hydraulic damping effect is generated. The dampening is similar to the effect at the retraction jounce stop, but in different geometry because of the packaging arrangement.

Damping effects are generated by other components during operation of the actuator 100. The previously discussed jounce stops 11, 20 exhibit passive damping. In other words, a load impacts the jounce stops, and the energy is absorbed by compressing the viscoelastic material of the jounce stops and forcing fluid through tight gaps. The energy is in part restorable energy. Some energy is stored in the spring like material and then when the spring like material expands, the energy is restored back to the system, and some energy is lost to damping.

The extension tube 1, and more specifically, the lubrication ports 1a, exhibit another type of damping. The lubrication ports 1a of the extension tube 1 exhibit active damping. i.e., damping the output motion of the extension tube when it is being driven by the motor or back driven by the load attached to the output tube. The roller screw lubrication system is designed to operate at a plurality of different lubrication levels, to be discussed later in further detail. When in operation during certain levels, or in any situation known in the art as a closed oil bath system, volume changes in the actuator as the extension tube enters and exits the actuator. As a result, fluid is forced in and out through the lubrication ports near the pin ring. With the actuator completely filled with fluid, the ports directly act like dynamic damping such that the size of the ports can be advantageously set such that if the actuator perhaps lifted a load, and power was unexpectedly cut, the load would be able to be dropped in a controlled manner, such as, like a shock absorber in a car. As the extension tube 1 is jammed back into the actuator due to the load, the lubrication ports 1a not only control fluid by allowing fluid to move out of the chamber where the roller screw is housed inside the extension tube 1, but also dissipate energy in the process. As such, the ports 1a act like dynamic damping due to the lubrication system of the roller screw.

Discussion of Isolated Lubrication Systems

The actuator includes two isolated lubrication systems, a first lubrication system for the roller screw system and a second lubrication system for the proximal bearing system. The isolated lubrication system permit unique operating pressure, cleanliness standards, lubrication selection and maintenance schedules. The two lubrication system allows for control of the two intrinsically different mechanical systems in the unit which require engineered lubrication system, i.e., the entire screw system and the shaft support system. Specifically, one of the two isolated lubrication systems is for the bearing/load-torque cell and the other is for the roller screw and linear drive components. The two isolated lubrication systems permit the very different mechanical components throughout the actuator to operate in an optimum environment, to allow long life, and efficient operation. Advantages of the inventive design include cleanliness of the lubrication, ability to individually match the lubrication to the mechanical component (bearing or roller screw components), and allow pressure isolation in the roller screw lubrication system so that the roller screw can operate in a pressurized environment with no venting.

The lubrication system for the bearing/load-torque cell supports the shaft from the radial load from the belt drive, as well as side loads resulting from asymmetry effects, and from axial thrust from the bidirectional load on the output end of the actuator. An actuator bearing requires a clean and controlled environment for long life. Bearing life is strongly affected by the lubricant and the contamination present in the lubricant. Advantageously, the bearing system is designed separate from the roller screw section. As such, the isolation allows for different lubricant requirements for the two systems. The roller screw generates a significant amount of debris that if allowed to contaminate the bearing would result in a significant reduction in life of the bearing, and the static pressure generated in the roller screw section of the unit could fail the seal on the bearing, thus damaging the seal, and sealing in debris, causing bearing failure. Further, due to a self-contained bearing mounting arrangement, it can also be used as a load/torque sensing device.

Figure 7:
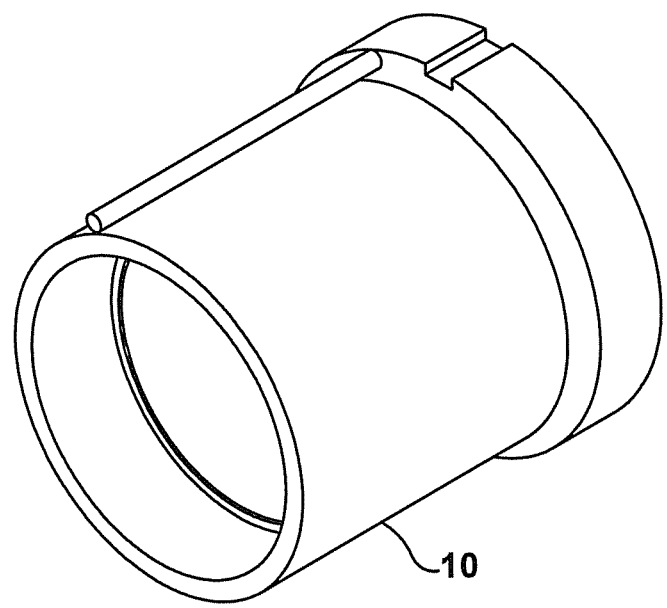
FIG. 7 is a rear perspective view of the load/torque sensor block of FIG. 6.
Figure 8:
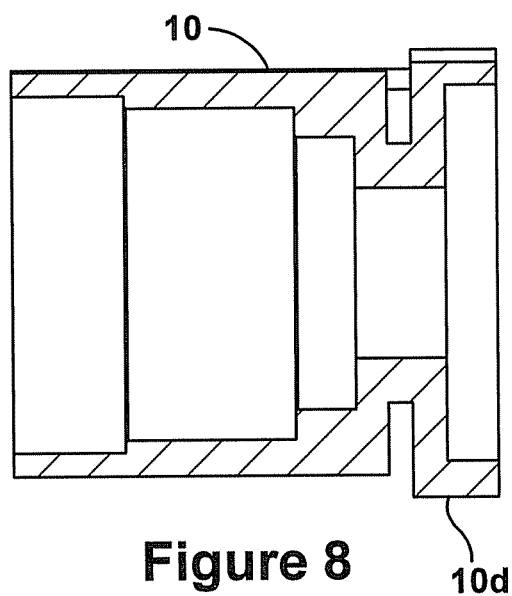
FIG. 8 is a cross-section view of the load/torque sensor block of FIG. 6, shown along the longitudinal axis of the actuator in an assembled orientation.
Figure 15:
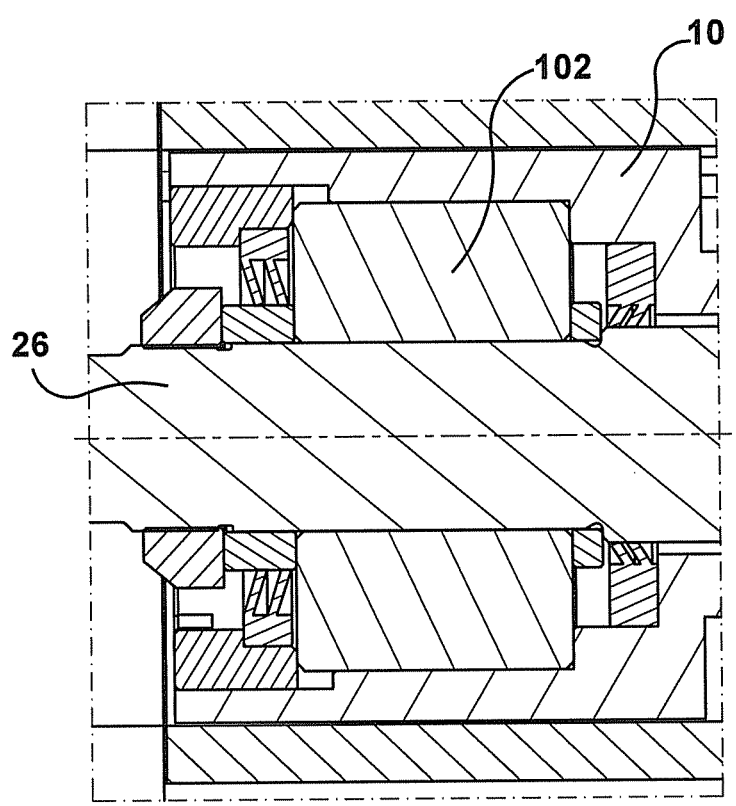
FIG. 15 is a front sectional view of a portion of the actuator of FIG. 1a, showing the bearing assembly.

The proximal bearing assembly is shown in a cross-section view in FIG. 15. The load cell itself is shown in FIGS. 7 and 8 in perspective and cross-sectional views. One way a self contained bearing mounting arrangement allows use as a load torque sensing device is very uniform clamping of the distal portion of FIG. 15 so that no residual stresses or flexor stresses are put into that section of the bearing cartridge, so it does not distort the stress pattern. Thus, it does not distort the indication of load or torque by clamping over the circumference of the device. Secondly, the bearings 102 are captured in this unit within the center of the pocket as shown in FIG. 15. The bearings are held in that pocket by being clamped. The outer faces are clamped via a collar in this position, then clamps those bearings in a pocket also without putting any pre-stress on the sensing section. The sensing section is located in the narrow throat near the distal end of the load cell as shown in FIG. 6. Thus, no pre-stress is created from that containment of the bearings either. Thirdly, the cartridge arrangement is positioned inside the actuator such that the outer walls of the small diameter proximal section of the load cell (best seen in FIG. 7) do not touch anything. As a result, the only path of transmitting force or torque is through the sensing section of the cathidge. This inventive design allows the load and torque to have a "no zero drift" because the way it is mounted into the actuator doesn't cause drift at zero point. Hence, all the load and all the torque goes through this bearing cartridge to permit only one flow path of load and torque, and allows essentially all load and torque to be captured in the predetermined sensing section.

Another important feature of the bearing cartridge is the mounted arrangement. A Belleville washer holds the collar, the larger diameter section of the bearing cartridge, in position so that there is no lash between both of the mounting faces of the larger section. With the cartridge clamped in between the two mating pieces that hold it in place, it is spring loaded into a pocket so there is no axial displacement of this unit. This arrangement keeps the lash to zero because the close tolerance control between the depth of this pocket allows line on line clamping between the parts. If not, then the two mating sections wouldn't clamp together. To achieve the desired no clearance condition and firmly captured the collar in its pocket, the spring is positioned to make sure there is zero clearance on the distal face of the load cell. The outer pieces that hold the bearing cartridge in place touch, to eliminate a leak path between a gap in the clamped pieces.

The arrangement of the cartridge has other benefits. Specifically, the cartridge assembly has the ability to attenuate actively shock loading. When something strikes the extension, a shock is caused to go down through entire unit because the shaft of the actuator is captured in the proximal bearings. With the spring in place, the whole cartridge is allowed to float under spring pre-load in its pocket so that if a shockwave happens, a small displacement can take out that load to have programmed flex by having the proximal bearing cartridge suspended. If there are two springs, then this system is preloaded to the center and if a shock load occurs in either direction, the whole bearing cartridge can float in either the anterior or posterior direction.

As discussed, the roller screw lubrication system allows for control of the roller screw and linear drive components. The roller screw lubrication system hardware generally includes of the roller screw, nut (complete with spur and ring gears), rollers, carrier, Internal Lubrication System Components (ILSC), including the lubricant impeller, External Lubrication System Components (ELSC), anti-rotate sliders, seals, wear bands, front spinning/plunging bearing (end of roller screw shaft), housing, extension tube, and magnets. All these components work in concert to assure that the rotary input motion results in a smooth linear output motion. These components must be lubricated and cooled, and the debris managed, such that it does not cause long term damage, enabling "lubricated-for-life" performance of the actuator. The system must also enable maintenance work to be done without interfering with the bearing lubrication system such as when the actuator has reached the rod gland and seal useful life. At the point these items need to be replaced, due in part to the separate arrangement, lubricant for the bearing is not contaminated or affected.

Figure 14:
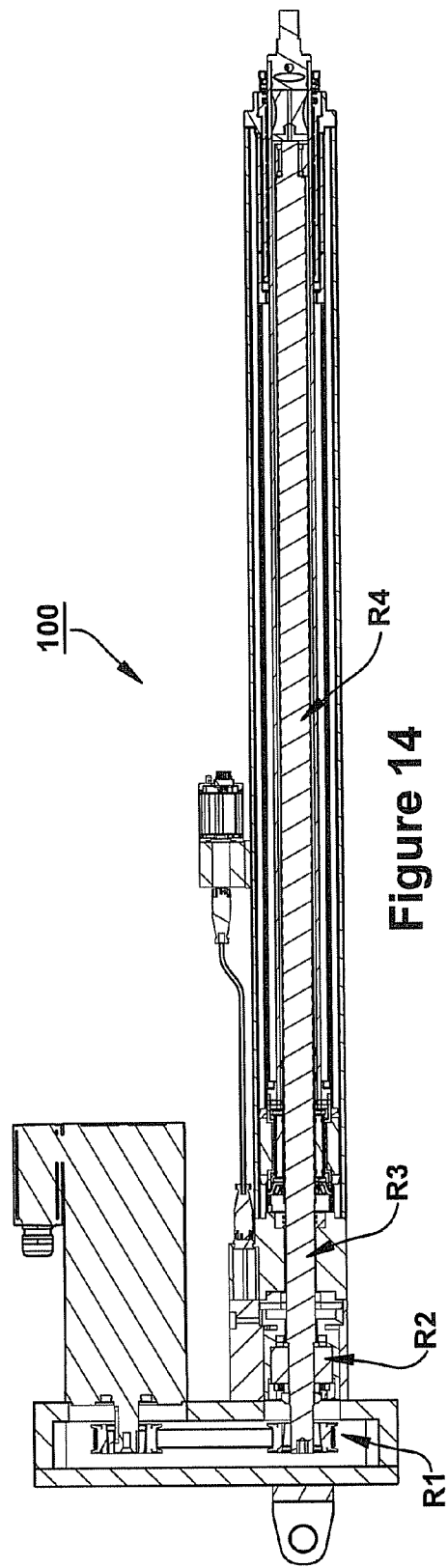
FIG. 14 is front view, partially in section, of the actuator of FIG. 1a, with regions of the isolated lubrication systems designated.

FIG. 14 shows a cross-section of the actuator and provides detail regarding the pressure difference between the two isolated systems. As shown in an exemplary operating condition, the pressure within the screw housing (in R4) can be several orders of magnitude more than the pressure within the belt housing (in R1), load cell housing (in R2) and linear position sensor housing (in R3).

A critical influence on life of the rotary bearing life is lubrication cleanliness. Contamination can typically come from the roller screw side. If there is any contamination in the bearing system, de-ration of almost one-half must occur in the calculations for life expectancy. In the inventive design, there is no anticipated path for any other foreign debris to get inside of this bearing. As a result, the invention offers up to an 100% increase in bearing life by preventing contamination by any other debris. Referring again to FIG. 14, the isolated lubrication systems allows the proximal bearing to not operate inside the same compartment R4 as the screw actuates, nor are the high pressures that can be experienced inside the screw section of the actuator are not apparent on the bearings within the bearing section R2. If the pressures apparent on the screw section R4 of the actuator acted upon the proximal bearing section R2, high pressure would inevitably force debris inside of these bearings. However, the isolated arrangement from the pressurized section of the actuator prevents a travel path. Even seals between the sections would eventually permit travel between the contrasting high and low pressure chambers if in an adjacent or contiguous position, i.e. without the presence of the fluid-free zone.

The feature of lubrication for life will now be discussed. In a preferred embodiment, an actuator not require lubrication maintenance. The invention minimizes maintenance and enables the actuator to be installed and essentially never maintained from a lubrication system standpoint. However, a situation may exist where an operator may find it beneficial to perform lubrication maintenance during the practice of this invention. In these cases, the actuator offers the operator inventive flexibility. The operator reserves the ability to do maintenance on the unit selectively. The unique design of the split lubrication systems addresses the two quite different mechanical systems. By splitting the two lubrication systems, a "lubrication-for-life" condition can be achieved for either or both mechanical systems.

Discussion of Roller Screw Lubrication System

Various lubrication embodiments exist for the roller screw lubrication system. Each embodiment offers added benefits from combining different lubrication system features into this actuator. One benefit is under very harsh duty where the operator expects generating a lot of wear debris, the external lubricator system has the ability to filter, and thereby minimize the amount of wear debris it is continuously being circulated in a unit. As a result, the life of the screw is extended.

The roller screw lubrication system is designed to optimize performance of the actuator. The lubrication system for the roller screw system includes a lubricant impeller, four distinct chambers, Internal Lubrication System Componentry (hereinafter "ILSC") and External Lubrication System Componentry (hereinafter "ELSC").

The roller screw lubrication system functions to allow proper lubrication of the moving components inside the screw housing (bearings, bushings, seals, screw, rollers, anti-rotation blocks, jounce stops, and magnetic system) which maximizes the expected life of the components and the actuator itself. The system enables the actuator to remove internal heat through a thermally conductive fluid (e.g., oil) that can be pumped through an externally mounted radiator. The system removes mechanical wear debris from the surfaces of moving parts. The temperature is homogenizes in the actuator to minimize thermal expansion effects, increase performance and life and allow the unit to reach the rated life. The system provides an option to use regenerative energy to return-to-home mode upon power outage (e.g., wind power industry), and ability to hydraulically lock the unit. Depending on the pressure range, the actuator can be filled with a nonvolatile gas such as nitrogen to prevent internal detonation from high pressure and temperature inside the actuator.

The exemplary lubrication system for the actuator 100 is arranged to have up to six possible levels, which range from an engineered grease system with circulated lubricant flow and lubricant impeller, to a forced, pressurized regenerative oil system with a lubricant impeller and integral cooling. The pressure settings of the components in the design can be adjusted to configure the system from a lubrication system of level 1 incrementally to a level 2, 3, 4, 5, or 6. The design is such that a lubrication system component add/delete approach can be used, allowing transition from lubrication system level 2 through to a level 6, using an integrated approach, as the lubrication system design has been incorporated in the overall actuator design.

As discussed, the lubrication system includes ILSC and the ELSC, that the actuator flow may be set up such that the ELSC works in conjunction with the ILSC to properly lubricate and deliver fluid to the ILSC, such as the screw and nut, front shaft bearing, jounce stops, lubrication ports and bypass channels. The lubrication system is designed to provide cooling, attenuate noise, charge the lubricant impeller, provide lubrication to the anti-rotate devices, deliver fluid to the temperature sensors in the unit, clean the running surfaces of debris, homogenize the temperature of the components inside the actuator system, and maintain seal lubrication.

As discussed, the ILSC is an integrated system of components that work together and with the ELSC to assure that the lubricant that is inside the actuator is managed in a programmed manner. The ILSC generally includes a lubricant impeller, a roller screw assembly, a housing with flow channels/bypass channels, ports for flow maintenance in the extension tube, jounce stops, seal and wear bands, lubricant, magnets for the position transducer and limit switches, and a distal bearing assembly.

Figure 1C:
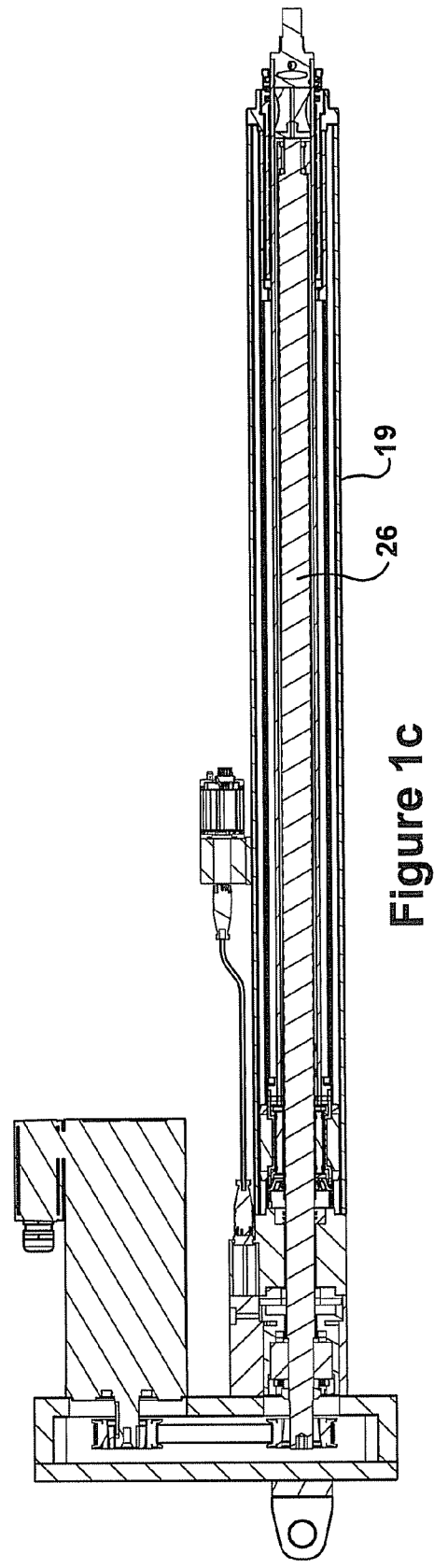

The lubricant impeller distributes and circulates lubricant, and is driven by the roller screw assembly. The housing allows lubricant bypass over the nut and creates pressure drop to force flow paths around and through the roller nut and into the ports in the extension tube. These ports allow the lubricant to flow between the four chambers described below, which are collectively designed to be under different pressures. The jounce stops utilize the fluid charged in them by the ILSC for damping to attenuate linear motion. The required seals and wear bands hold fluid in the lubrication system and receive fluid from the ILSC to permit the seal and bands to run cool and be properly lubricated for long life. Magnets capture debris that is programmed to flow past these magnets, yet prevent buildup that can damage running surfaces. In regard to the distal screw bearing, the four pressure chambers in the system combine with the ports in the extension tube to allow fluid to reach the front screw bearing, and then be drawn into the chamber in front of the bearing. Such a path allows lubrication of the sliding portion of the bearing, even when the actuator is oriented vertically, allowing long life and tight clearances throughout life, allowing high speed rotary motion of the roller screw shaft. The plunging motion with the clearances around the distal high speed bearing results in programmed damping when the fluid in the chamber is ejected, thus resulting in programmable damping using the clearance between the high speed bearing and the ID of the extension tube as the tuning variable for a given lubricant. FIG. 12 is a series of cross-sectional view of the actuator of FIG. 1, showing four lubrication chambers C1, C2, C3, C4 within the screw housing, along with a chart to detail relative pressure during extension and retraction of the extension tube. These chambers will be discussed later in more detail.

| | Actuator Chamber Pressure | | | |
| --- | --- | --- | --- | --- |
| | Chamber | | | |
| Motion | 1 | 2 | 3 | 4 |
| Extension | Low Pressure | High Pressure | High Pressure | Low Pressure |
| Retraction | High Pressure | Low Pressure | Low Pressure | High Pressure |

Referring again to the magnets for the position transducer and limit switches, the magnets optimize lubrication performance by preventing buildup of debris, and specifically, more so than a conventional magnetic drain plug. The magnets are placed in strategic locations for the fluid flowing from the four different chambers in the screw section of the actuator. Bypass ports exist in the extension tube to allow fluid to pass from various chambers in the actuator allowing fluid to vent or be drawn into the front chambers of the actuator which causes circulation over those magnets, which then continuously expose the magnets to particulate that can be separated. In a conventional actuator, a magnet drain plug is located somewhere in a stagnant part of the system that by happenstance a particulate travels near. For example, in an engine, a plug is located in the drain pan, not adjacent to the camshaft where the debris is being generated. In the referred embodiment, the magnets are advantageously located at the points of debris generation to catch debris before the debris can travel to through the rest of actuator. As required, fluid circulating past the magnets repeatedly provides multiple chances to capture debris. As a result, the concentration of debris within the lubrication fluid is less during operation.

The preferred embodiment includes plating to effectively capturing the particulate on the magnets, rather than trying to capture particulate on other sections of the screw. Other magnetic capture methods may magnetize or may buildup debris on sections in which particle buildup is undesired. In other words, material is captured predominantly in only certain locations to prevent buildup in other areas. For example, the pin ring located in the distal front section of the roller nut has all the circumferentially position magnets located adjacent to the bypass ports in the extension tube.

The magnets are set up to capture and maintain the debris while not compromising the magnetic performance of the magnets as they actuate the position transducers or the limit switches. If particulate was allowed to buildup in a non-program manner, the magnet particulate buildup may begin to obscure the magnetic field, thus causing a degradation of the performance of our unit. The magnets capture the particulate and then hold it in strategic locations that are outside of the moving interfaces of the unit. Another magnet 4 on the outside of the roller nut captures an additional amount of particulate which when that particulate builds up there is a gap between the outside of the nut and the inside of the housing to allow a buildup of debris there without causing a buildup on moving services.

Figure 16:
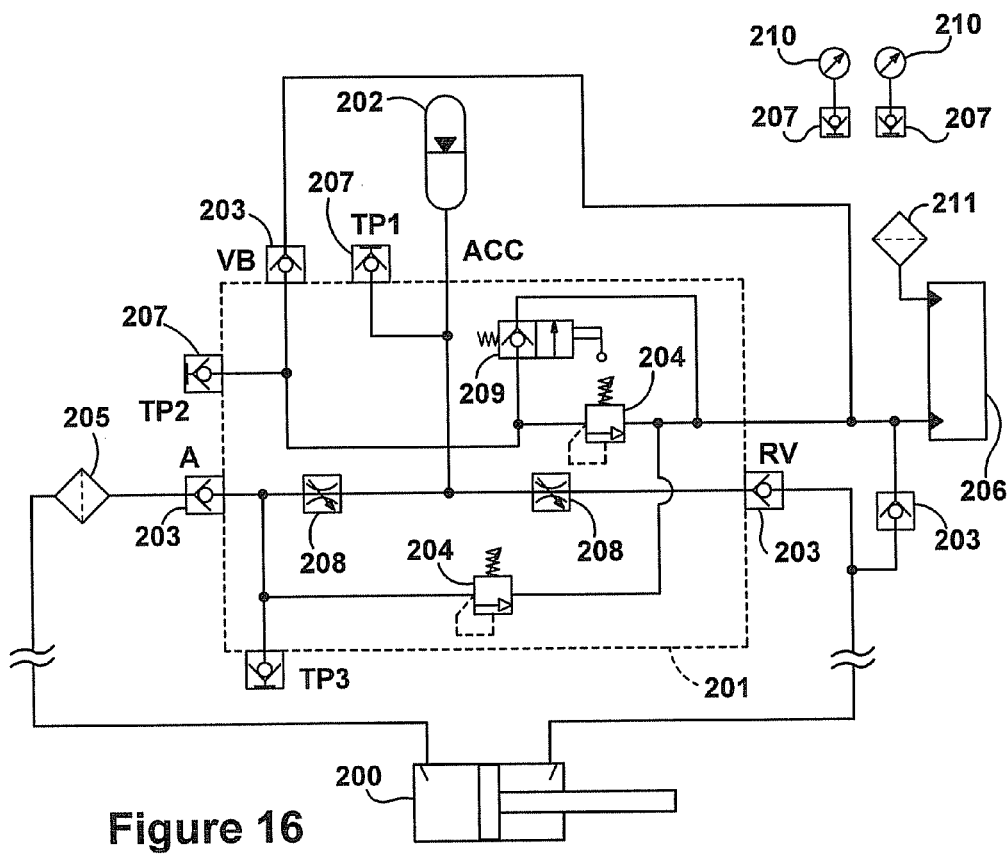
FIG. 16 is a schematic of an exemplary lubrication flow pattern within exterior lubrication components.

The ELSC is an integrated system of components that work together and with the ILSC to assure that the lubricant that travels outside the actuator is directed, cleaned, and cooled such that it can be returned to the ILSC so lubrication, cooling, homogenization, and regeneration can occur in a programmed manner. The ELSC generally includes the items shown in the schematic flow pattern illustrated in FIG. 16, with the actuator shown at the bottom of the schematic. The components of the exemplary flow pattern are listed in the section that follows. It is apparent to one with ordinary skill in the art that the invention can be practice with a different combination of components, less components, or more components.

| 200 | Actuator |
|---|---|
| 201 | Manifold |
| 202 | Accumulator |
| 203 | Check Valve |
| 204 | Relief Valve |
| 205 | Filter |
| 206 | Reservoir |
| 207 | Port Coupling |
| 208 | Flow Control Valve |
| 209 | Manual Valve |
| 210 | Gauge |
| 211 | Breather |

This exemplary schematic describes the ELSC attached to the actuator. The connection ports in the actuator are connected to the ELSC according to the orientation in which the actuator will operate. The actuator intake line (lower right side of the diagram) does not need to be flooded and is designed to direct lubricant in a programmed manner to assure that the actuator components are properly lubricated. The actuator exhaust line is flooded, and is positioned such that the fluid is returned to the ELSC in a fairly well-bled (ingested-air-free) manner (although the system is designed to promote self bleeding of the fluid and reject entrained air). The placement of the connection points of the ELSC to the actuator allow the actuator to operate in any predetermined orientation, by assuring that the connection points properly interface with the sump of actuator fluid as required. This arrangement, along with ILSC (e.g., the flow paths in the actuator, four distinct chambers, the lubricant impeller), as well as the proper fill volume of lubricant in the actuator, results in assurance that the actuator component are properly lubricated. The ELSC is designed to be either mounted directly on the actuator, or can be mounted remotely in functional proximity to the actuator.

The lubrication system can have a varying air versus lubrication ratio, e.g., 0% to 100% air. The volume of fluid that is placed in the actuator, by design, materially influences the operating pressure differentials in the actuator vs. stroke. The amount of air volume that is allowed in the actuator affects the volumetric efficiency of the lubricant system. Thus, air volume can be used to affect external flow rate through the actuator. With a large amount of air in the actuator, volume changes resulting from the extension tube moving in/out of the actuator result in small pressure changes, and with a low volumetric efficiency at higher speed (volumetric efficiency is the ratio of quantity of fluid actually entering the ELSC to the theoretical amount possible if all the pressure resulting from motion entered the ELSC, i.e., under quasi-static conditions) and thus flow rate through the ELSC will be low, and the volume of fluid transferred to the ELSC will be low. Conversely, with a small amount of air in the actuator, volume changes resulting from the extension tube moving in/out of the actuator result in large pressure changes, and with a high volumetric efficiency at higher speed and thus flow rate through the ELSC will be high, and the volume of fluid transferred to the ELSC will be high. Furthermore, as air in the actuator approaches zero, the flow rate in the ELSC will approach the theoretical flow rate and have near 100% volumetric efficiency. As mentioned, the lubrication system has six lubrication method embodiments, or hereinafter, levels. A detailed discussion of the levels and the related role of the actuator componentry follows.

Figure 17:
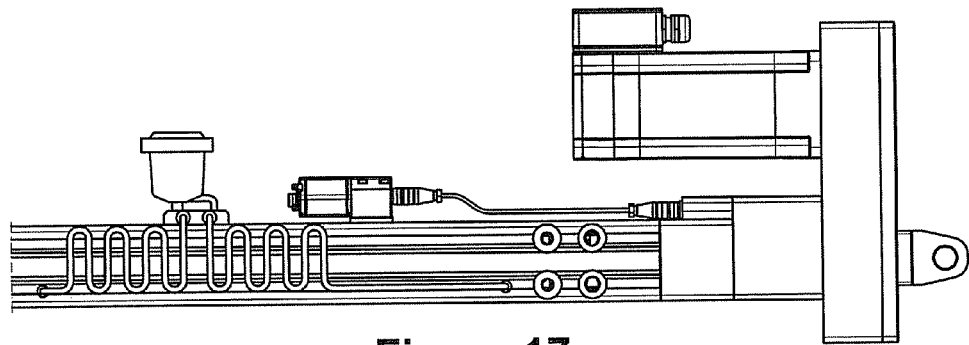
FIG. 17 is front view of the actuator of FIG. 1a modified for an exemplary level of fluid lubrication.

The lube level system 1 has ILSC components described in the provisional application and the fluid is grease. The lube level system 2 is effectively the same components as lube level system 1, except the lubricate is oil instead of grease. Both level 1 and 2 include the lubricant compeller, as do all levels. An exemplary lubrication system for level 3 is shown in FIG. 17. In lube level system 3, air is present inside of the actuator in addition to lubricant inside of the actuator. However, lube level system 3 has these external lubrication system components as part of it and the reservoir for fluid is a low pressure accumulator that can take some of the fluid from inside of the actuator and allow it to circulate through the external lubrication system components.

The purpose of the transition for level 3 to level 4 is to increase circulation of the fluid. To reach the lubrication level system 4, components are added to lube system 3, such as a heat exchanger or the like, to increase the surface area exposed to the environment. Alternatively, a counter flow heat exchanger could be used in which a small heat exchanger may be water cold. As mentioned, the arrangement of FIG. 17 can be used, where the fluid from inside the actuator passes through the heat exchanger and the external lubrication components and then is cooled by the environment.

In lubrication system level 5, the amount of air in the system for an air over oil system is greatly reduced, which enables significant volume change from the extension to entering the actuator to force a fluid flow. In contrast, in lube level 3 and 4, a lower percentage of volumetric change in the actuator actually is volumetric fluid flow external to the actuator. In level 5, the higher percentage allows do active damping because as the volume changes inside the actuator that comes with high levels of volumetric efficiency, e.g., 80% and above.

The purpose of the transition from level 4 to level 5 is to increase the volumetric efficiency by reducing the amount of air in the system so that most of the volumetric change goes to fluid flow. By doing so, orificing can be done as the fluid moves inside and external to the actuator can be damping. This arrangement has several benefits. For instance, if an actuator lifts a load and then power is turned off, the load is typically allowed to fall still connected to the actuator. Because the actuator is pumping fluid through an external fluid cell, there is almost no air in the system now that fluid is acting is damping. As a result, the actuator permits a soft fall of that mass that is on the actuator while it consumes no electric power.

In lubrication level 6, an overflow container is used to hold the fluid and effectively act as an accumulator to store energy. The multiple levels of the inventive actuator allow an operator to select a desired volumetric efficiency. With levels 5 and 6, the volumetric efficiency increase to change in volume drives fluid flow external to the actuator more than in lube level 2 and 3. Further, less air is in the actuator so it is more towards a 100% filled actuator that is 100% filled with fluid.

An operator may rely upon the amount of air to put into this system as a tuning variable. As a result, an operator can make any pressure differential happen with any volumetric change from the extension to entering or exiting actuator. The fill level is a tuning variable in the actuator. An operator may fill it to a certain level to obtain a proper lubrication, and at the same time, achieve the desired change in pressure from the volumetric changes. This feature allows an operator an immense tuning ability to the system.

Referring again to lube level 6, when the extension tube retracts, a volumetric change may be caused because very little air is in the system, driving the pressure significantly higher and desireably charging the accumulator. For example, with the accumulator charged in the retract direction, to now re-extend the rod instead of the motor having to exclusively drive the load, the stored energy in the accumulator is able to drive the load. This arrangement reduces power consumption, and reduces wear and tear of the actuator components. Reduction occurs because in effect moving a load up and down without this ability would require power to be driven through the screw and the lift and the retract direction. In a system employing lube level 6, power really only is driven appreciably through the actuator in the retract direction because in the lift direction the accumulator is dumping its energy back to the system to re-lift the load. Thus, level 6 decreases the motor requirement, decreases the energy consumption from electrical power, decreases the wear of the mechanical components, increases the potential for duty cycle at high loads because all power is not required through the mechanical components, and heat generation is reduced.

One fail safe method that stems from lube level 6 is an advantage in wind turbines. In conventional systems, the system must be electrically driven to get the propeller blades to return back to home to prevent the wind turbine from over revving. In a system with lube level 6, a small hydraulic accumulator can be charged so that when the system needs to returned to home, such as for example under a power failure, in a pitch controlled system for wind turbines the accumulator can have its energy directed towards the actuator. As a result, the extension tube is pushed out of the actuator returning the blades to their home position. The back drivable nature of the roller screw embodiment of this actuator allows the return to happen. The accumulator can be recharged in very short order and the system brought back on line. Other conventional systems require batteries recharged to drive the motor. The present actuator permits at least two power sources, one from the mode of force which is the motor and another one from this accumulator charge and lubrication level 6.

As discussed previously, the actuator has the ability to preload the screw follower, i.e., the nut. Because this design is able to withstand pressure in all of its lubrication system embodiments with a static pressure applied to the actuator, the rotary engagement with the linear component inside of this actuator is enabled. As mentioned, the rotary component may be a roller screw, a ball screw or an acme screw, or any other component that may effectively become preloaded. The preloading enables the system to act as a zero lash system in a direction. For example, if the system is always pulling on a component, the system with pressure installed in the actuator always has the extension tube being pushed out of the actuator. Thus, if the extension tube is connected to something that is being pulled, no lash occurs to take out because the reaction load on the extension tube is in the same direction as the preload from the pressure. Even if the system becomes worn, no effective lash occurs between the mating components. As a result, no motion happens without motion on the outputs, so it effectively becomes a zero lash system due to the lubrication system design. Therefore, the system functions as a zero lash system due to the nature of this ability to pressurize, which is advantageously quite inexpensive and self compensating.

Figure 18:
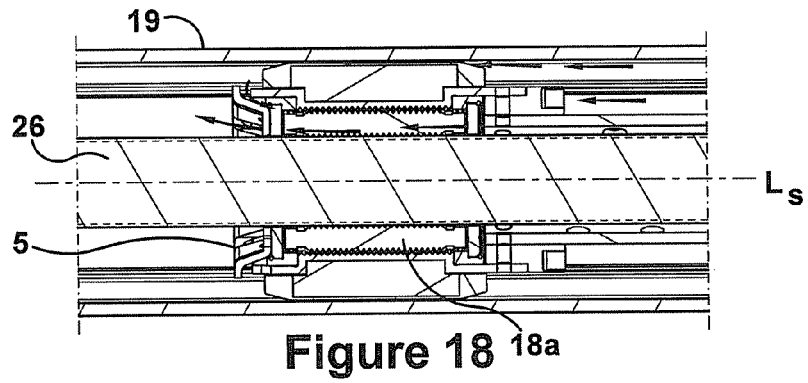
Figure 19:
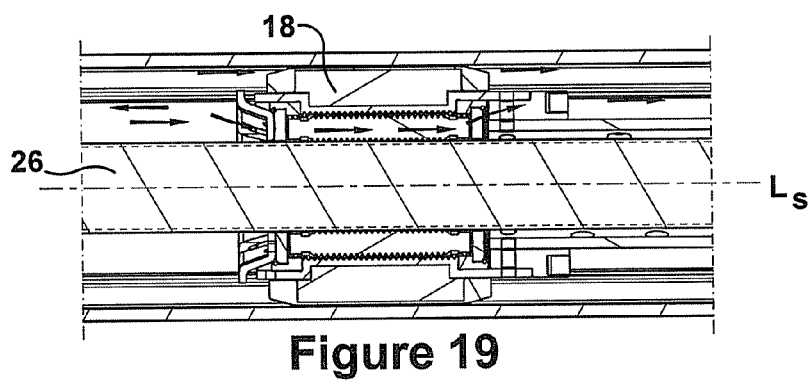
Figure 20:
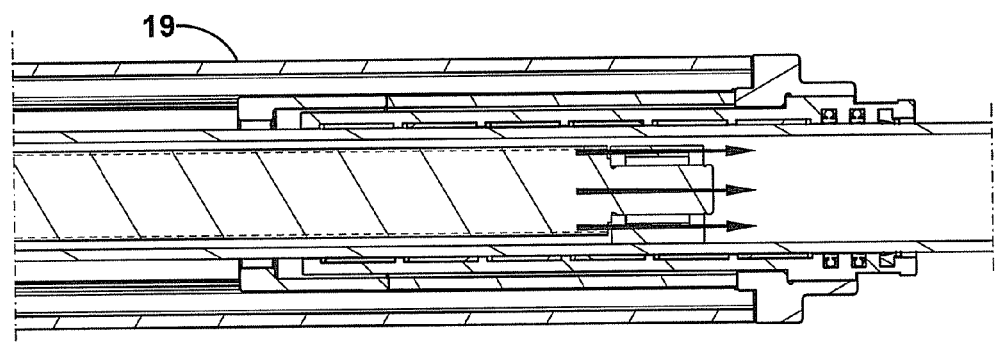
Figure 21:
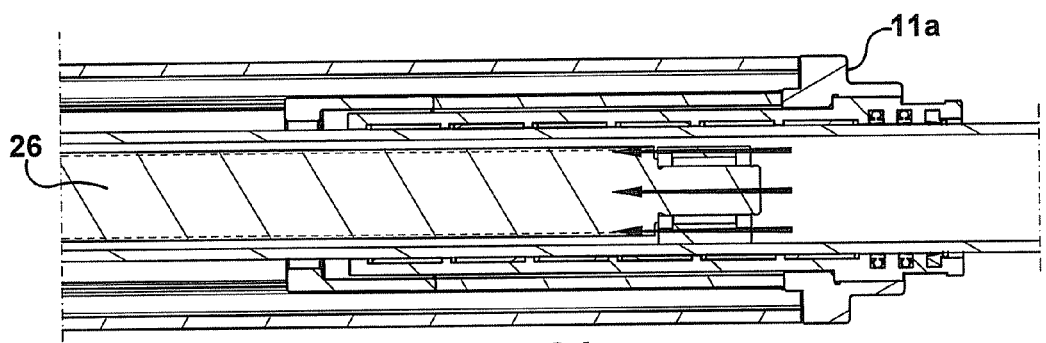

Certain moving components of the lubrication system will now be discussed. The lubricant impeller, shown in FIG. 11, is fixed to the a carrier plate. The rotational velocity of the impeller, angle of the impellers, and bypass channels in the impeller provide the proper lubrication between the roller nut and screw. The lubrication impeller provide the general lubrication path shown in FIGS. 18-19. The lubricant impeller 5 is rotating at a speed less than a speed of the roller screw 26, such as for example, 0.5-0.75 of the screw speed, as well as translating such that the lubricant is being pumped radially and axially in the system. As a result, the components near the centerline $L_s$ of the screw 26, and the components radially outward from the centerline are being lubricated. The pumping motion of the lubricant impeller is in both the radial and the axial direction such that lubricant is caught in the impeller motion, and swirled throughout the actuator with a combination of radial and axial flow. The funnel-like shape of the impeller directs the lubricant toward the interior and the exterior of the roller nut assembly 18. In cases where the actuator is mounted in an inclined position, the impeller gathers lubricant from the lower end of the actuator that is submerged (or in cases where the actuator is level, in which the grease may have slumped toward the bottom of the actuator) and re-distributes the lubricant throughout the actuator, preventing sections of the actuator from having little or no lubricant and causing damage to other sections.

As mentioned, FIG. 12 is a series of cross-sectional view of the actuator of FIG. 1, showing four lubrication chambers within the screw housing, along with a chart to detail relative pressure during extension and retraction of the extension tube. The internal lubricant flow rate due to the displaced volume inside the actuator when the extension tube is retracted can be calculated and subsequently used to predict performance of the actuator.

Discussion of Load Torque Cell/Bearing Lubrication

The load/torque cell and lubrication system for the proximal bearing offers many features over prior art designs. The system is an important key in the execution of the lubrication system for the bearing and with the execution of this lubrication system in a stand-alone support system. Use of this design permits bidirectional load and torque sensing without zero shift.

The load/torque cell and lubrication system for the proximal bearing system has several advantageous features. The location of load/torque cell is disposed away from output end for increased performance results. The system does not require any exposed wires at the output end. The bearing/load torque lubrication is isolated from the distal end roller screw lubrication. The system also offers the ability to measure the load on the roller screw directly for life predictions (external load measurement gives the load external to the unit). By this arrangement, the actuator life can be increased by 10 to 20% or more depending on errors from inertia.

Internal load measurement is advantageous over external load measurement and can be quantitatively stated. For example, if a load that is exerted on the screw measured internally was 2500 pounds, a frictional drag exists and other inefficiencies in the system that resulted in the actual output of the actuator only providing 2300 pounds a force. The traditional equation to predict million revolutions of life is rated load over actual load cubed. Using the internal load sensor, the 2500 pounds and 19500 pounds of rated screw load result in 508 million revolutions possibly using internal predictions. If an external load cell is used, the prediction would be 652 million revolutions of rotation available in the screw. Therefore, the internal life prediction and the external life prediction is 77.9%, internal vs. external. As a result, using the external load cell to predict the life of the actuator would result in an over 20% error. If one used 2500 pounds and 2400 pounds, the error would be about 11.5%. Thus, the internal sensor allows more accurate life monitoring as compared to conventional actuators.

The bearing system functions to axially support the roller screw in tension and compression, i.e., bidirectional loading. The system radially support the belt pulls as it acts as an overturning moment on the screw shaft. The major components of the bearing system includes the bearings, seals, spacers, instrumented cartridge, locking nuts, Belleville preload washer and load ring, and the lubricant.

Figure 22:
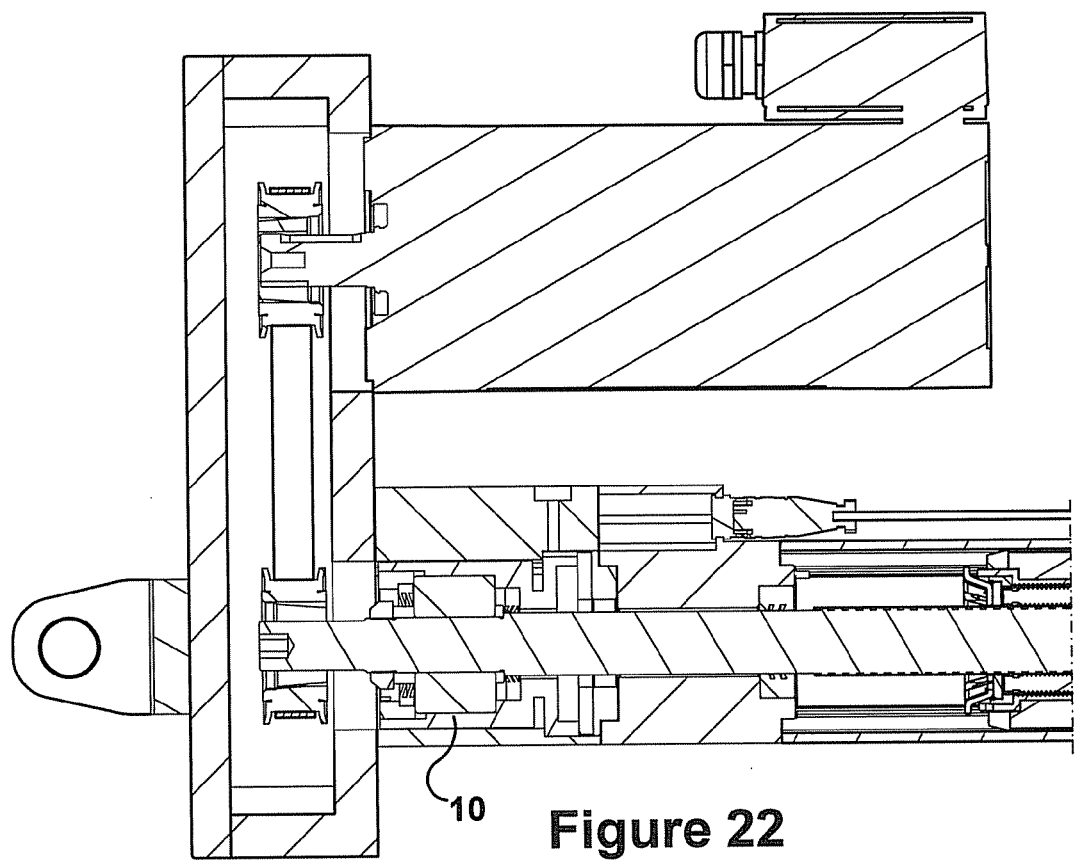
Figure 23:
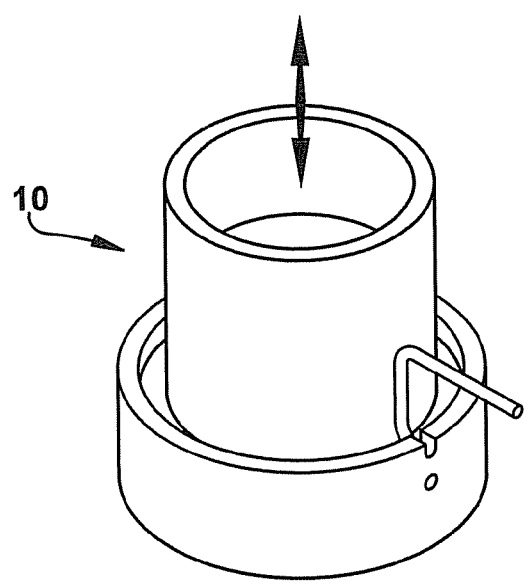
Figure 24:
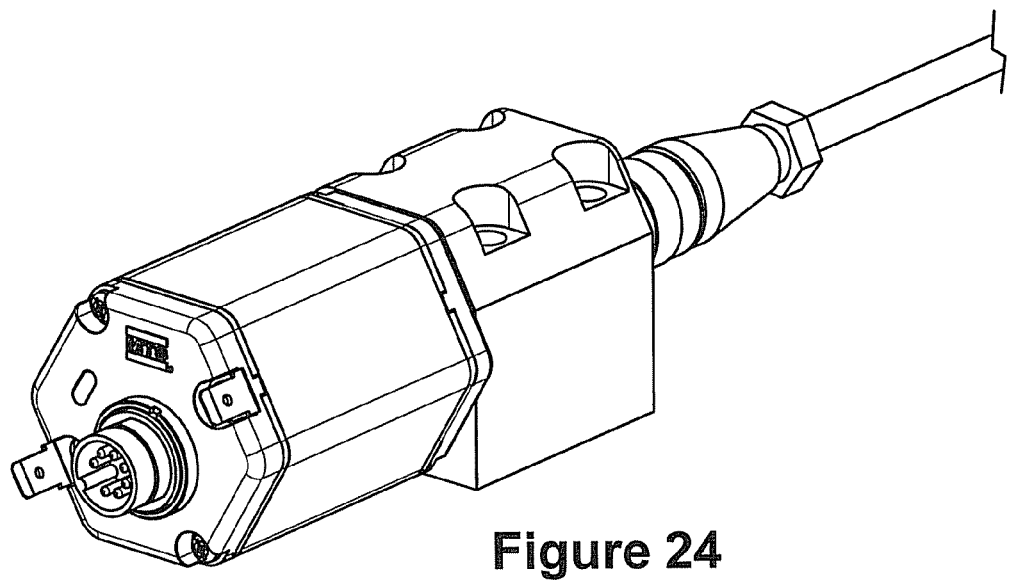
Figure 25:
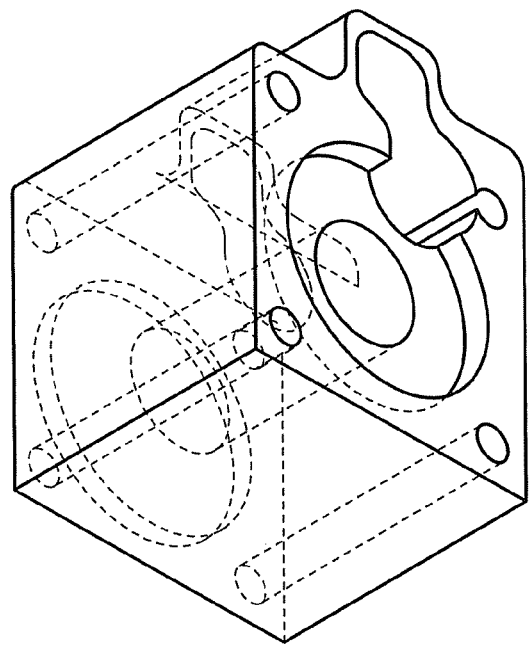

The proximal bearing cartridge will now be discussed. An exemplary load cell cartridge is illustrated in an installed in FIGS. 22 and 23. The load cell itself is shown in FIGS. 7 and 8 as previously discussed. The instrumented bearing cartridge is designed to measure axial force and bending moment from the belt tension, with no change in calibrated zero due to mounting arrangement with the collar captured, such that the instrumented diaphragm is not stressed, thus preventing zero drift. Additional components may include (2) single-row face-to-face tapered roller bearings in a ground matched pair, a bearing seal, bearing spacers, and a castle nut.

In an exemplary assembly, the load cell is slid over the rear of the roller screw shaft until it meets a shoulder on the screw. A low pressure rotary seal is slid down the roller screw shaft until in butts up against the load cell. The rear bearing assembly is slid into the load cell and around the roller screw shaft. A lock nut and washer is screwed down threads on the roller screw to secure the bearings inner race. A spacer is slid over the bearings outer race. A castellated nut (containing a low pressure seal) and washer is screwed down threads located on the load cell inner diameter to secure the bearings outer race. The low pressure seal in the castellated nut becomes sealed when the nut is torque against the spacer. As a result, the bearings have an IP67 rated seal via the low pressure and low pressure rotary seal that are integrated into the rear bearing assembly. The bearings shall support the actuators axial load rating.

Exemplary bearings are selected to provide a maximum L10 life by balancing package size, affordability, side load, axial load, and angular speed. The approximate maximum belt pull for an exemplary 1:1 belt driven is dependent on the pulley's pitch diameter and the actuator running at max rated load and speed. In an exemplary calculation, the pitch diameter was selected to be that of the smallest pulley in a 2:1 belt drive. As such, there is only be a maximum of 2 pulley sizes for 1:1, 2:1, and 1:2 pulley combinations. As a result, the maximum belt pull for a 30 mm roller screw is 600 lbs. This size is equivalent to the side load on the bearing assembly. However, the distance from the pulley to the bearing's position on the screw shaft results in an overturning moment acting on the bearings. It should be noted that the bearing axial load and side load are coupled through "belt pull." An increased/decreased axial load increases/decreases the required "belt pull" (side load). As a result, the bearing equivalent load calculation must recalculate side loading as a result of axial loading each time the equation is to be used. For example, using the tapered roller bearing from the calculation above, the bearing life is recalculated. A decreased side load results, as a result of decreased belt pull due to the decreased axial load. The procedure above illustrates the use of the load and torque aspects of the load/torque sensor to determine an efficiency of the actuator, by examining a comparison of torque required to generate axial load.

The dynamic and static load rating for a bearing can be calculated using an industry formula (e.g., ISO 281-2007: Rolling bearings—Dynamic load ratings and rating life). In other words, one way to calculate the lives for the bearings involve a life factor for cleanliness of lubrication. With the isolated lubrication systems, the contamination factor equals essentially 1.0. In a contaminated system, that factor begins to drop off and can commonly reach 0.5 and less. If so, the expected life becomes half of the present inventive system.

The load/torque sensor aspect of the bearing cartridge will now be discussed. As discussed, illustrations of an exemplary load cell are shown in FIGS. 7, 8, 22 and 23. The present invention can be practiced with a load cell having different characteristics, or with two or more load cells.

The importance of the load cell cartridge/bearing cartridge can be measured by its positive effect on other aspects of the inventive actuator. It separates and holds the lubrication for the bearings and it also holds the seals for those bearings to allow a self contained lubrication system, isolated the screw lubrication system. The load cell cartridge/bearing cartridge allows the system to be easily assembled. Further, the system is assembled to enable the bearing cartridge/load cell cartridge to be a completely self-contained unit that the shaft slides through.

Further, the load cell cartridge/bearing cartridge provides a space/pressure relief null zone R2 between the high pressure section R4 and the low pressure section R2 (see FIG. 14). This space enables the retention of the two chamber lubrication system, even if one of the seals fail. In other words, if one of the high pressure seals fail or one of the low pressure seals fail, a zone exists between the high and low pressure systems at zero pressure. The zone provides a second barrier of isolation because of the bearing/load cell cartridge. The regions of FIG. 14 are identified as follows, and include the following exemplary lubrication.

R1: Belt Housing Assembly (Lubrication—none)
R2: Load Cell Housing (Lubrication—grease)
R3: Linear Position Sensor Housing (Lubrication—none)
R4: Screw Housing (Lubrication—grease or oil)

Further, alignment between the two sealing systems which each exist on the same roller shaft 26 is possible. The shaft passes from the high pressure section into low pressure section, and seals of different style and type are disposed on the shaft. The rear bearing cartridge, because it has some ability to radially float whenever the system is bolted together before it is all bolted down, can properly pilot on the shaft, and then be bolted down so that all the seals can work without wearing out, substantially achieving desired seal life.

The load cell/bearing cartridge also allows shock absorption with the earlier discussed Belleville spring. This feature works as an added benefit to the jounce stops that are part of this system. The load cell/bearing cartridge set up allows the bearings to stay cool and out of the conductive and convective path of the hot screw environment. Therefore, the bearings last in their enclosed environment buried inside of the actuator.

The load cell/bearing cartridge also allows for thermal expansion. The section of the load cell/bearing cartridge that is not fixed, the bearings are held inside of the cartridge, is allowed to actually float. This arrangement enables thermal expansion to happen and therefore not change the zero reading of the load cell. If the cartridge was fixed or otherwise constrained, the shaft would be pulling and not have anywhere to float and therefore it could change the zero setting during operation.

Discussion of Absolute Measurement System

The integrated absolute position measurement system uses the integrated lubrication system and the appropriate related sealing systems for maximum performance. Specifically, the absolute position measurement system is embedded in the actuator to run parallel to the moving components of the actuator, while still allowing the entire package to maintain internal pressure. The magnetics from the absolute position measurement system further function as a separation system in the lubrication system for particulate removal.

The absolute position sensor and integrated magnetic components offer many benefits including improved position measurement of the extension tube, isolation of lubrication, lubricant debris separation and removal, and the ability to retain internal pressure while still getting position sensing signals out of the interior of actuator. As the absolute position measurement system is arranged, the system contributes to a vibration proof package with the fully supported sensor rod in the housing.

The inventive system also offers unique packaging advantages for an electromechanical actuator. The magnet moves along the sensing element (see FIGS. 9 and 10), but not on the centerline of the sensing element which otherwise would require magnetic design and integration of the magnetic components with the actuator, while properly arranging the magnets such that they do not interfere with other signals in the unit and also interface with the lubrication system. Prior art position transducers have magnets that surround the sensing element, an arrangement which is cumbersome to package in an electromechanical actuator. Also, hydraulic systems do not have moving internal components as in an electro-mechanical device, and thus the need for the inventive design has not arisen. Further, conventional electromechanical actuators do not encompass as much feature content, and conventional hydraulic actuators may have a hollow core into which the sensor rod can pass, which is essentially impossible in an electromechanical actuator. The actuator 100 includes a magnet that passes by the sensing element on the side, and is actually part of the traveling component (nut/extension tube) in the actuator.

Figure 27:
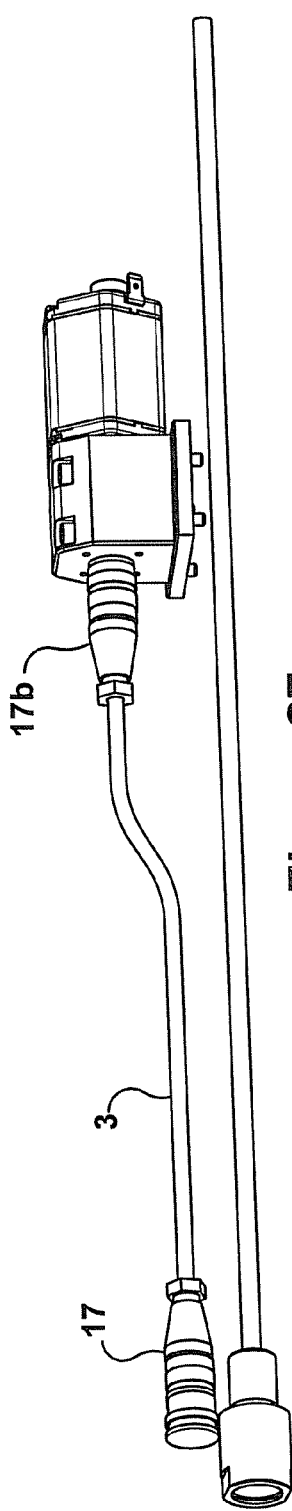
FIG. 27 is a perspective view of an exemplary linear position transducer assembly, including a linear position sensor and a position sensor rod.
Figure 28:
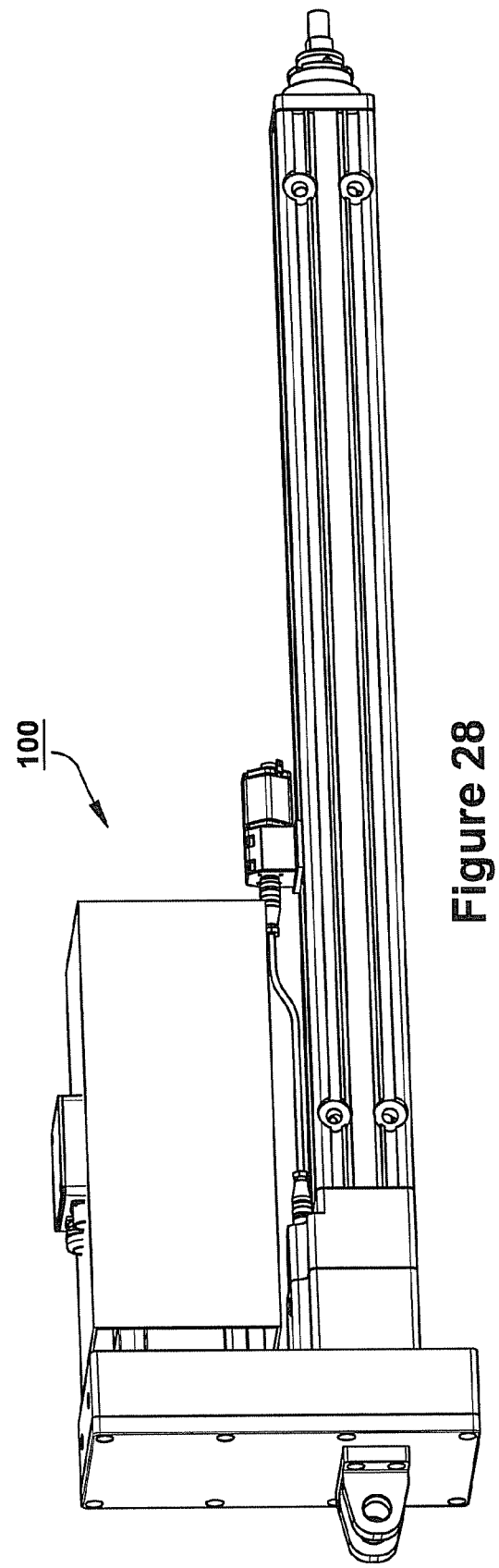
FIG. 28 is a perspective view of the linear position transducer assembly of FIG. 27, shown installed within the linear position sensor housing of FIG. 25.

The linear position sensor operates to provide precise and accurate absolute position measurement of extension tube relative to a fixed point. A perspective view of an exemplary limit position transducer 17b is illustrated in FIG. 27. To mount the sensor onto the actuator 100, the linear position sensor rod 3 is fed through a hole in the linear position sensor housing, as shown in FIG. 28. A threaded fitting at the end of the sensor rod is screwed into the housing, effectively locking the sensor rod in place. The sensor rod passes through the linear position sensor housing and is supported by the screw housing 6b, shown in FIG. 4. The linear position sensor wires are connected to a male, rear mount, MS style connector. The cables and connector exit the actuator in an eccentric position, rather than conventionally on the centerline of the actuator. To be discussed, this off-center arrangement has multiple benefits.

It should be understood the integration of the magnetics with other systems is enabled by the sensing element being disposed off center relative to the longitudinal axis of the actuator. As such, the magnetic elements in the system function to actuate the position transducer, actuate the limit switches, and separate debris from the actuator.

The sensor rod 3 is completely integrated within the actuator. As a result, the rod is vibration resistant because the sensing element is fully supported along the length of the actuator. It is located within the confines of the physical envelope of the actuator so it is protected from external impact. Further, no protrusions exist on the outside of the actuator housing to cause any damage or interfere with the operation, which allows any of the four sides of the actuator to be a selectable mounting face.

The actuator is designed as a sealed lubrication system. The section of the actuator containing the position transducer can maintain high pressure because the transducer is designed to work within a high pressure lubrication system. No exit ports exist that the sensor travels through, i.e., ports that cannot tolerate high pressure. The routing of the sensor allows any occurrence of high pressure to be retained in the high pressure section R4 of the actuator.

Certain prior art actuators require the packaging of a position transducer in an after assembly or after market environment. When a high speed actuator with high speed rotary and linear components are involved, the system is subjected to potential damage and fairly crude packaging in which the magnet that is triggering the position transducer has to be held by some kind of a nutriment to the extension tube, or the position transducer has to be set eccentrically to the moving components of that actuator. Often it is not practical to try to put the position sensor inside the center of spinning shaft. Thus, the actuator 100 utilizes an integrated arrangement, with the sensor rod and whole magnetic system and lubrication system working together to create high precision, robustness and compact packaging.

Figure 26:
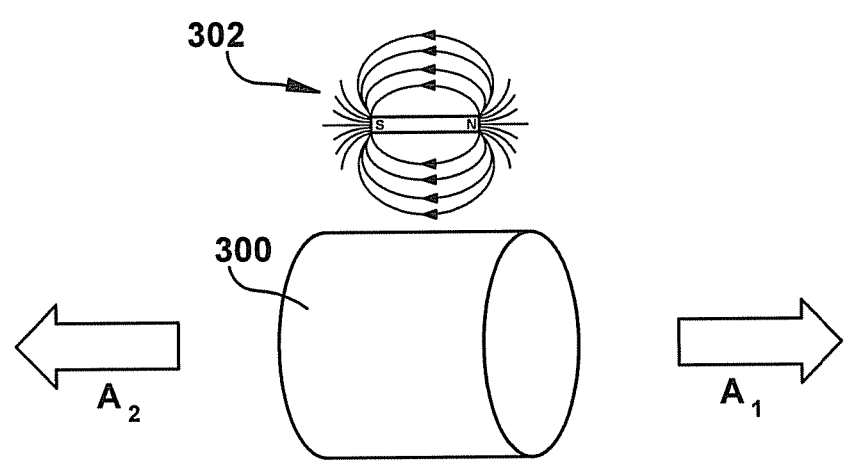
FIG. 26 is a schematic of a roller nut showing an exemplary magnetic field generated by the inductive position sensor magnets relative to the inductive position sensor.

The inductive position sensor magnet is designed to trip the inductive position sensor. More specifically, the magnet provides sufficient gauss and magnetic field shape to accurately and repeatable trip the inductive position sensor. The inductive linear position sensor uses the center of the magnets peak radial flux lines to determine the position of the roller nut. As a result, the inductive position sensor magnet is oriented with the north-south axis parallel to the roller screw and the north direction pointing towards the actuators rod end. A schematic of the exemplary roller nut 300 is shown in FIG. 26, illustrating an exemplary magnetic field 302.

A plurality of magnets are used in a preferred embodiment. In one embodiment, inductive position sensor magnets are potted into the face of the pin ring (non-magnetic material designed in conjunction with the magnet arrangement and type to get the proper magnetic signature at the position transducer and the limit switch sensors) in the first quadrant (axial view of actuator looking at the rod end). In an exemplary position, the magnets are positioned from the X and Y axis by 9 degrees and are spaced out in 18 degree increments. The magnetic field of these magnets cover the first quadrant of the screw housing which will actuate inductive position sensors in two of the t-slots running down the screw housing 6b (see FIG. 4). The number of magnets and positions located can vary in the practice of this invention.

Example magnets may include neodymium iron boron (type 42SH) magnets. Other suitable magnets can be found at http://www.kjmagnetics.com. The inductive position sensor magnet may have a magnetic strength rating of 26 MGO or 11,000 gauss. The magnet is designed to not lose any magnetic strength within the operating temperature range of the roller nut. As a result, low grade neodymium magnets (only high temperature) cannot be used due to their sensitivities to temperature spikes.

Figure 29:
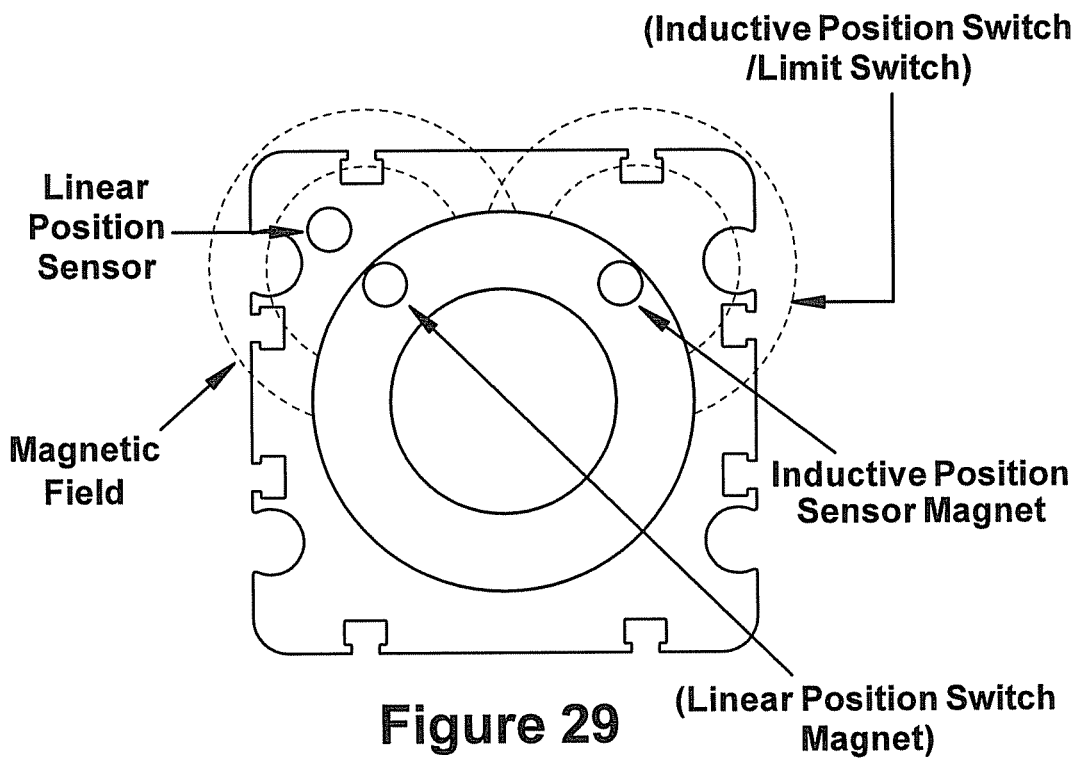
FIGS. 29 and 30 are cross-sectional views of a pin ring of the actuator of FIG. 1a, showing possible locations for the inductive position sensor magnets, the inductive position switch, the linear position sensor, and the linear position sensor magnet.
Figure 30:
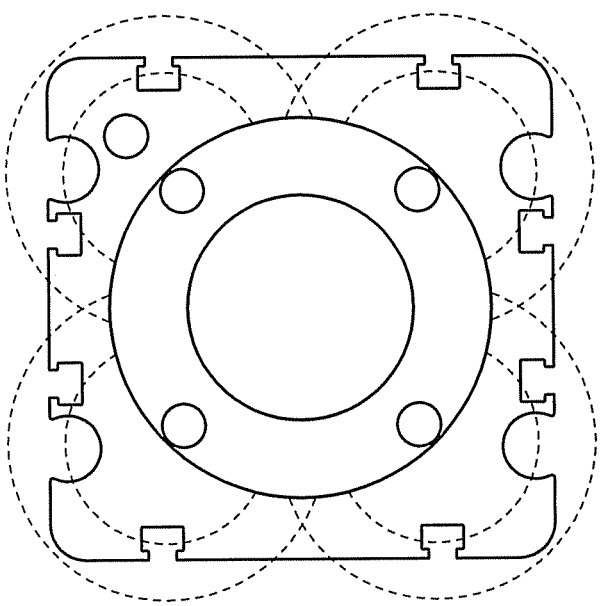

FIGS. 29 and 30 shown possible locations for the inductive position sensor, the linear position sensor, inductive position sensor magnets, and the linear position sensor magnet. It should be understood these figures are for example only, and other positions and combination can be used in the practice of this invention. Further, it should be understood that these views do not represent position difference between magnets along the longitudinal axis of the roller screw. For example, the magnets in the pin ring are positioned distal along the axis relative to the linear position sensor magnet.

The linear position sensor magnet determines the magnets position along the sensing rod. More specifically, the linear position sensor magnet provides sufficient gauss and magnetic field to allow the linear position sensing rod to accurately and repeatably determine the magnets position along the sensing rod.

Figure 31:
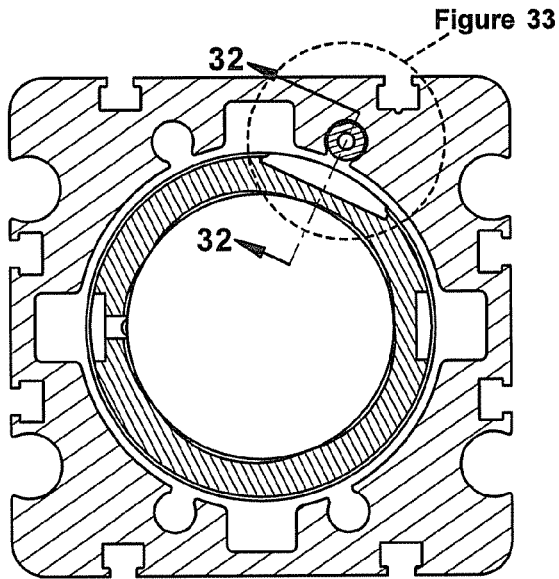
FIG. 31 is a sectional view of an exemplary mounting location for the linear position sensor magnet.
Figure 32:
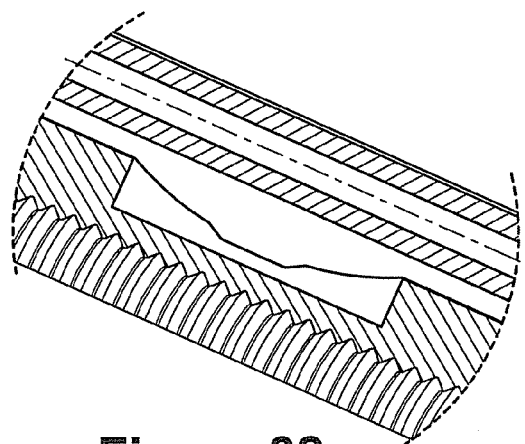
FIG. 32 is an enlarged cross-sectional view along the line D-D of FIG. 31 within the area designated by the radius E.
Figure 33:
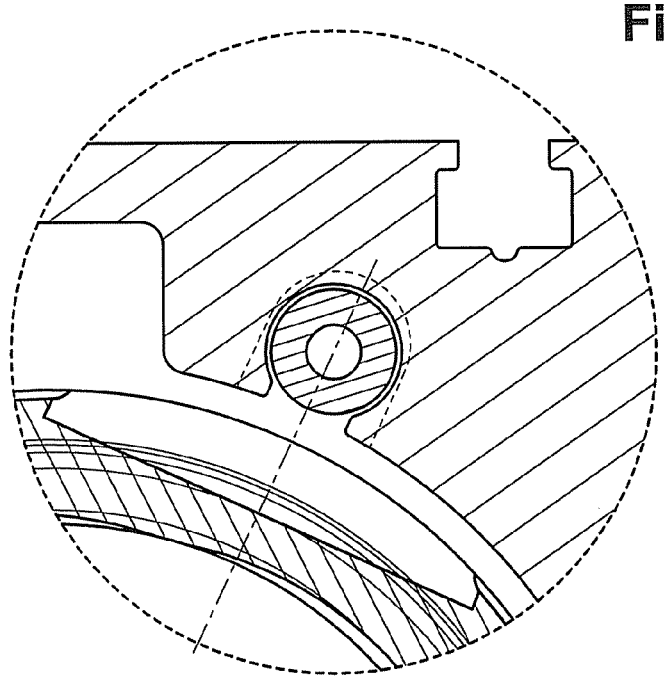
FIG. 33 is an enlarged cross-sectional view of FIG. 31 within the area designated by the radius E.
Figure 34:
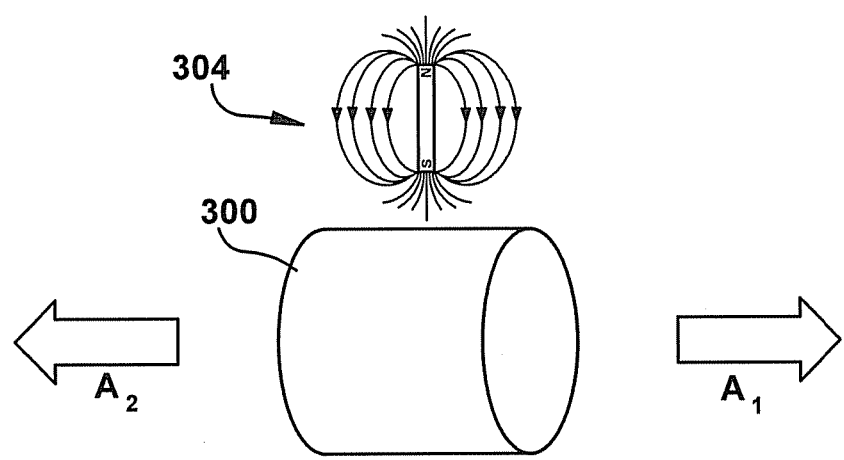
FIG. 34 is a schematic of a roller nut showing an exemplary magnetic field generated by the linear position sensor magnet relative to the linear position sensor rod.

The linear position sensor magnet are placed inside a pocket on the roller nut such that the magnets poles are on an axis that is radial to the center of the center of the roller screw. The south pole faces the roller screw and the north pole faces the sensor rod. An exemplary mounting position is illustrated in FIGS. 31-33 within a magnet pocket (Detail D) location on the roller nut. An example magnetic field 304 is shown in FIG. 34. The linear position sensor is based of magnetostrictive technology which determines the position of the roller nut via the magnets magnetic flux poles. As a result, the linear position sensor magnet is oriented with the north-south axis perpendicular to the roller screw and the north direction pointing towards the sensor rod. An exemplary linear position sensor magnet may have a magnetic strength rating of 18 MGO or 8000 gauss. Other technologies do work with this invention, such as for example, LVDT technology.

An embodiment on the invention uses one D61SH neodymium iron boron magnet (42SH), available from http://www.kjmagnetics.com. Another exemplary magnet is samarium cobalt material. The linear position sensor magnet are potted or pressed into a nonmagnetic material that is attached to the roller nut. The nonmagnetic material protects the magnet from abrasion/wear and prevents metallic wear debris from imbedding itself into the magnet or nonferrous supporting material but most importantly does not distort the magnetic field of the sensor magnets and allows the designed magnetic pattern to prevail and trigger the sensors. The nonmagnetic material is selected to have excellent wear characteristics, resistance to oil and grease lubrication, and thermal expansion properties suitable to its environment. The magnet may lose magnetic strength within the operating temperature range of the roller nut. As a result, certain low grade neodymium magnets cannot be used due to their sensitivities to temperature spikes.

Discussion of Jounce Stop/End of Travel/Shock Management System

The actuator 10 includes a jounce stop/end of travel/shock management system which operates to manage and control load. Jounce stops absorb the impact of an over traveled actuator and restrain the roller nut from impacting the front and rear actuator hard stops. The jounce stop/end-of-travel/shock management system uses the presence and delivery system of the lubricant in the actuator to help dissipate the impact energy from a jounce. As such, the jounce stop/end of travel/shock management system is designed to provide maximum benefit when operating in concert with the actuator lubrication system. The jounce stop/end of travel/shock management system controls the travel path of the extension tube, and as required, generates force for retraction of the extension tube.

An exemplary jounce stop/end of travel/shock management system includes two jounce stops located near the distal end of the extension tube. The jounce stops will be referred to as extension jounce stop and retraction jounce stops for purpose of discussion. The extension jounce stop and retraction jounce stop may be located at the distal end of the actuator such that they can be replaced without major disassembly of the actuator. The retraction jounce is located in the extension tube just behind the rod end. The extension jounce is located between the screw housing and extension tube just behind the front end plate and rod gland. The extension jounce stop is pressed into the screw housing behind the rod gland assembly and is held in place by a friction clearance fit. The retraction jounce stop is pressed into the extension tube behind the rod end and is held in place by a friction clearance fit.

An exemplary retention jounce stop is illustrated in FIG. 5a, showing a sectional view of the distal end of the actuator 100 along the longitudinal axis of the roller screw 26. An exemplary extension jounce stop is also shown in FIG. 5a. As positioned, the jounce stops are not prone to becoming dislodged after impact with the roller nut or roller screw shaft. Other types, numbers and combinations of jounce stops and travel control mechanisms can be used in the practice of this invention.

As discussed, proper function of the shock management system requires actuator lubrication. The invention integration of the shock management system with the lubrication system allows a reliable storage of fluid near these jounce stops to keep them cooled and have fluids to reject to attenuate the impact and reject energy to fluid damping and very importantly to replenish the fluid for another following impact. As shown in the Figures, the jounce stop in positioned for ease of removal from the distal end of the actuator. This location is inventive, as conventionally travel stops are placed either on each end of the nut, or on each end of the housing and therefore one side is buried well within the actuator.

Further, conventional travel stops are also not designed and positioned to actually remove energy, but rather to just provide protection to metal end surfaces during assembly to prevent bumping metal on metal. In contrast, the inventive shock management system removes energy out of a high speed high load impact and avoids damage to the rest of the actuator systems by controlling the peak load experienced during that crash. i.e., the impact of the distal end of the extension tube 1 is absorbed every cycle of the roller screw 26.

The jounce stop material may be selected for a thermal expansion tolerance to at least the operating environment temperature range. Preferably, a jounce material is selected that is both moldable and machinable. An exemplary jounce stop is made from urethane, but other materials can be used in the practice of this invention.

The operation of the jounce stop will now be discussed. An exemplary jounce stop will have viscoelastic properties and exhibit both viscous and elastic characteristics when undergoing deformation as well as the ability to seal. Viscous materials resist shear flow and strain linearly with time when a stress is applied. Elastic materials strain instantaneously when stretched and just as quickly return to their original state once the stress is removed. Viscoelastic materials have elements of both of these properties and, as such, exhibit time dependent strain. The jounce stop is disposed in a chamber with lubrication fluid filling at least part of the remaining volume. To be discussed, the jounce stop has controlled volume as it is being compressed, and as a result, the fluid that escapes from the chamber in which the jounce stop is housed is also controlled.

Upon impact, a low speed impact will be absorbed primarily by the viscoelastic damping of the urethane jounce stop. As such, the jounce stop will attenuate a load and cushion the blow of a low speed impact. On a high speed impact, which is an advantageous application of the invention, the actuator functions in the most difficult condition where high loads are developed from inertial impacts. The system works to not just store energy, but to absorb energy. As the load is impacting the jounce stop, the volume of the jounce stop chamber reduces, which causes the fluid to jet out of the jounce system. Therefore, the fluid provides damping to the linear motion and works to reject energy, and not just store energy. A conventional spring merely stores energy.

Using the above-discussed methodology, the shock management system rejects energy by forcing the lubrication from the lubricant system through a small passage. As a result, the system attenuates the impacts by storing energy in the viscoelastic jounce stop elastomer, and in the jounce stop system attenuating the load, by rejecting that energy to fluid from the lubrication system. Without the lubrication system and its inventive lubrication distribution properties, a reliable presence of fluid is not possible. Rather, whatever impact may be experienced in certain situations, a conventional system would be able to be fully functional and in other situations where fluid didn't by happenstance get to the jounce stops then the benefit of the damping would not be lessened or non-existent, and damage to the mechanical components could occur.

The benefits of the shock management system and the lubrication system can be quantified. The jounce stop is designed to manage the volume-fill vs. position of the jounce stop system to deliver a force vs. travel curve at the end of travel such that the design load of the actuator is not exceeded. The system uses viscoelastic damping and fluid damping by using the jounce stops as a pump/orifice. The energy is dissipated when the jounce is struck in multiple ways, such as for example, radially expended into the screw housing, linearly expended into the front end plate, released as friction as the jounce rubs against the screw housing and extension tube, and absorbed by the compression of the jounce itself.

Another beneficial portion of the shock management system is a suspended Load/Torque cell/Bearing Cartridge that uses a Belleville washer in a pre-compressed mode. The Belleville washer preloads the bearing cartridge such that upon high compressive loads, the Belleville washer compresses and acts to cushion the load into the actuator.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

What is claimed is:

1. A mechanical actuator comprising:
    a motor;
    screw assembly comprising a housing, a threaded screw shaft disposed within said housing, a nut assembly, and an extension tube, said threaded screw shaft rotatable by said motor and said nut assembly arranged to move in either direction along a longitudinal axis of said threaded screw shaft when said threaded screw shaft is in rotational motion, thereby moving said extension tube between an extended position and a retracted position;
    a bearing assembly arranged to provide support to at least a portion of said threaded screw shaft;
    a first lubrication system comprising a lubrication impeller, wherein said lubrication impeller rotates at a speed no more than a rotational speed of said threaded screw shaft, the system arranged to provide lubrication to said screw assembly;
    a second lubrication system comprising a second set of components and arranged to provide lubrication to said bearing assembly;
    wherein a pathway of said first lubrication system is remote and isolated from a pathway of said second lubrication system.

2. The mechanical actuator of claim 1 wherein said threaded screw shaft is a roller screw.

3. The mechanical actuator of claim 1 wherein said first lubrication system includes a first lubricant and said second lubrication system includes a second lubricant.

4. The mechanical actuator of claim 1 wherein said first lubrication system is operable at a different temperature and at a different pressure than said second lubrication system.

5. The mechanical actuator of claim 1 wherein a cavity of zero pressure is defined within said actuator at a location between said pathway of said first lubrication system and said pathway of said second lubrication system.

6. The mechanical actuator of claim 1 wherein debris from said screw assembly is contained within said first lubrication system, and said debris from said bearing assembly is contained within said second lubrication system during rotational movement of said threaded screw shaft.

7. A mechanical actuator comprising:
    a motor;
    screw assembly comprising a housing, a threaded screw shaft disposed within said housing, a nut assembly, and an extension tube, said threaded screw shaft rotatable by said motor and said nut assembly arranged to move in either direction along a longitudinal axis of said threaded screw shaft when said threaded screw shaft is in rotational motion, thereby moving said extension tube between an extended position and a retracted position;
    a screw assembly lubrication system arranged to provide lubrication to said screw assembly, wherein said screw assembly lubrication system comprises a lubrication impeller, wherein said lubrication impeller rotates at a speed no more than a rotational speed of said threaded screw shaft;

wherein a pathway of said screw assembly lubrication system includes a plurality of chambers;

further wherein a pressure within each chamber is variable and dependent on movement of said extension tube between said extended position and said refracted position.

8. The mechanical actuator of claim 7 wherein one of said plurality of chambers is disposed distally from said extension tube and one of said plurality of chambers is disposed proximally from said extension tube.

9. The mechanical actuator of claim 7 wherein said screw assembly lubrication system comprises four chambers.

10. A mechanical actuator comprising:

a motor;

an actuator housing;

screw assembly comprising a threaded screw shaft disposed within said housing, a nut assembly, and an extension tube, said threaded screw shaft rotatable by said motor and said nut assembly arranged to move in either direction along a longitudinal axis of said threaded screw shaft when said threaded screw shaft is in rotational motion, thereby moving said extension tube between an extended position and a retracted position;

a screw assembly lubrication system comprising a lubrication impeller, wherein said lubrication impeller rotates at a speed no more than a rotational speed of said threaded screw shaft; and an absolute position measurement system for determining position of said nut assembly, said system comprising a linear position sensor rod positioned entirely within said housing and parallel and off center relative to a longitudinal axis of said threaded screw shaft, at least one position sensor magnet attached to said nut assembly, and at least one limit switch;

wherein the absolute position of the nut assembly is measured in relationship to an axial position of the housing.

11. The mechanical actuator of claim 10 wherein said at least one position sensor magnet is disposed within a lubrication pathway of said screw assembly lubrication system.

12. The mechanical actuator of claim 11 further comprising a plurality of magnets installed in said nut assembly at a location distal of said at least one position sensor magnet and are arranged to trigger said limit switch.

13. The mechanical actuator of claim 12 wherein said plurality of magnets attract debris within said screw assembly lubrication system.

14. The mechanical actuator of claim 10 wherein said actuator housing has four elongated sides and said absolute position measurement system is operable with said actuator installed by any of said four elongated sides.

* * * * *